US011641120B2

(12) United States Patent
Okuoka et al.

(10) Patent No.: US 11,641,120 B2
(45) Date of Patent: May 2, 2023

(54) BATTERY MOUNT DEVICE

(71) Applicant: MAKITA CORPORATION, Anjo (JP)

(72) Inventors: Tomokazu Okuoka, Anjo (JP);
Masayoshi Okumi, Anjo (JP); Takaaki Kato, Anjo (JP)

(73) Assignee: MAKITA CORPORATION, Anjo (JP)

( * ) Notice: Subject to any disclaimer, the term of this patent is extended or adjusted under 35 U.S.C. 154(b) by 504 days.

(21) Appl. No.: 16/597,380

(22) Filed: Oct. 9, 2019

(65) Prior Publication Data

US 2020/0119318 A1  Apr. 16, 2020

(30) Foreign Application Priority Data

Oct. 11, 2018  (JP) .............................. JP2018-192865
Oct. 11, 2018  (JP) .............................. JP2018-192882

(51) Int. Cl.
*H02J 7/00* (2006.01)
*H01M 50/209* (2021.01)
(Continued)

(52) U.S. Cl.
CPC ......... *H02J 7/0045* (2013.01); *H01M 50/209* (2021.01); *H01M 50/244* (2021.01);
(Continued)

(58) Field of Classification Search
CPC .. H01M 50/20; H01M 50/147; H01M 50/244; H01M 50/209; H01M 50/262;
(Continued)

(56) References Cited

U.S. PATENT DOCUMENTS 5,848,904 A * 12/1998 Kikuchi ............. H01R 13/4534
439/911
2010/0014221 A1* 1/2010 Shi ...................... H04M 1/0262
361/679.01
(Continued)

FOREIGN PATENT DOCUMENTS

CN        1985384 A     6/2007
CN      102386348 A     3/2012
(Continued)

OTHER PUBLICATIONS

Machine English translation of Konishi WO2013/027599 (Year: 2013).*
(Continued)

*Primary Examiner* — Michael L Dignan
(74) *Attorney, Agent, or Firm* — Sughrue Mion, PLLC

(57) ABSTRACT

A battery mount device may include a housing to which a battery pack is detachably attached, and a cover attached to the housing so as to cover the battery pack and configured to open and close by rotating around a rotation axis. Force in a direction closing the cover may act on the cover in a state where the battery mount device is placed on a horizontal plane. The battery-mounted device may further comprise a cover holding mechanism capable of holding the cover in an open state. The cover holding mechanism may include a cover holder configured to move, in response to an operation by a user, between a holding position where the cover holder interferes with a rotating motion of the cover and a released position where the cover holder does not interfere with the rotating motion of the cover.

11 Claims, 27 Drawing Sheets

(51) Int. Cl.
*H01M 50/244* (2021.01)
*H01M 50/271* (2021.01)
*H01M 50/262* (2021.01)

(52) U.S. Cl.
CPC ....... *H01M 50/262* (2021.01); *H01M 50/271* (2021.01); *H02J 7/0044* (2013.01)

(58) Field of Classification Search
CPC .... H01M 50/271; H02J 7/0044; H02J 7/0063; H02J 7/0045; Y02E 60/10
See application file for complete search history.

(56) References Cited

U.S. PATENT DOCUMENTS

| | | | | |
|---|---|---|---|---|
| 2011/0281149 | A1* | 11/2011 | Hutchings | H01M 10/62 429/99 |
| 2012/0052356 | A1* | 3/2012 | Sugiura | B25F 5/00 429/100 |
| 2016/0114732 | A1* | 4/2016 | Sawada | B60R 7/00 224/400 |
| 2017/0319020 | A1* | 11/2017 | Kling | A47K 10/36 |

FOREIGN PATENT DOCUMENTS

| | | | | |
|---|---|---|---|---|
| CN | 103183187 | A | 7/2013 | |
| CN | 203134921 | U | 8/2013 | |
| CN | 204045695 | U | 12/2014 | |
| CN | 103183187 | * | 8/2016 | ............ B65D 85/86 |
| JP | 63-171219 | U | 11/1988 | |
| JP | 2003-312394 | A | 11/2003 | |
| JP | 2004-43125 | A | 2/2004 | |
| JP | 2006-32089 | A | 2/2006 | |
| JP | 2012-48885 | A | 3/2012 | |
| WO | 2013/027599 | A1 | 2/2013 | |
| WO | WO2013-027599 | * | 2/2013 | ............ H01M 10/50 |

OTHER PUBLICATIONS

Machine English translation of CN 103183187 (Year: 2016).*
Machine English translation of JP 2004-043125 to Oniki (Year: 2004).*
Notice of Reasons for Refusal dated Jul. 19, 2022 from the Japanese Patent Office in Japanese Application No. 2018-192865.
Notice of Reasons for Refusal dated Jul. 26, 2022 from the Japanese Patent Office in Japanese Application No. 2018-192882.
Office Action dated Aug. 18, 2022 in Chinese Application No. 201910962483.6.

* cited by examiner

FIG. 27
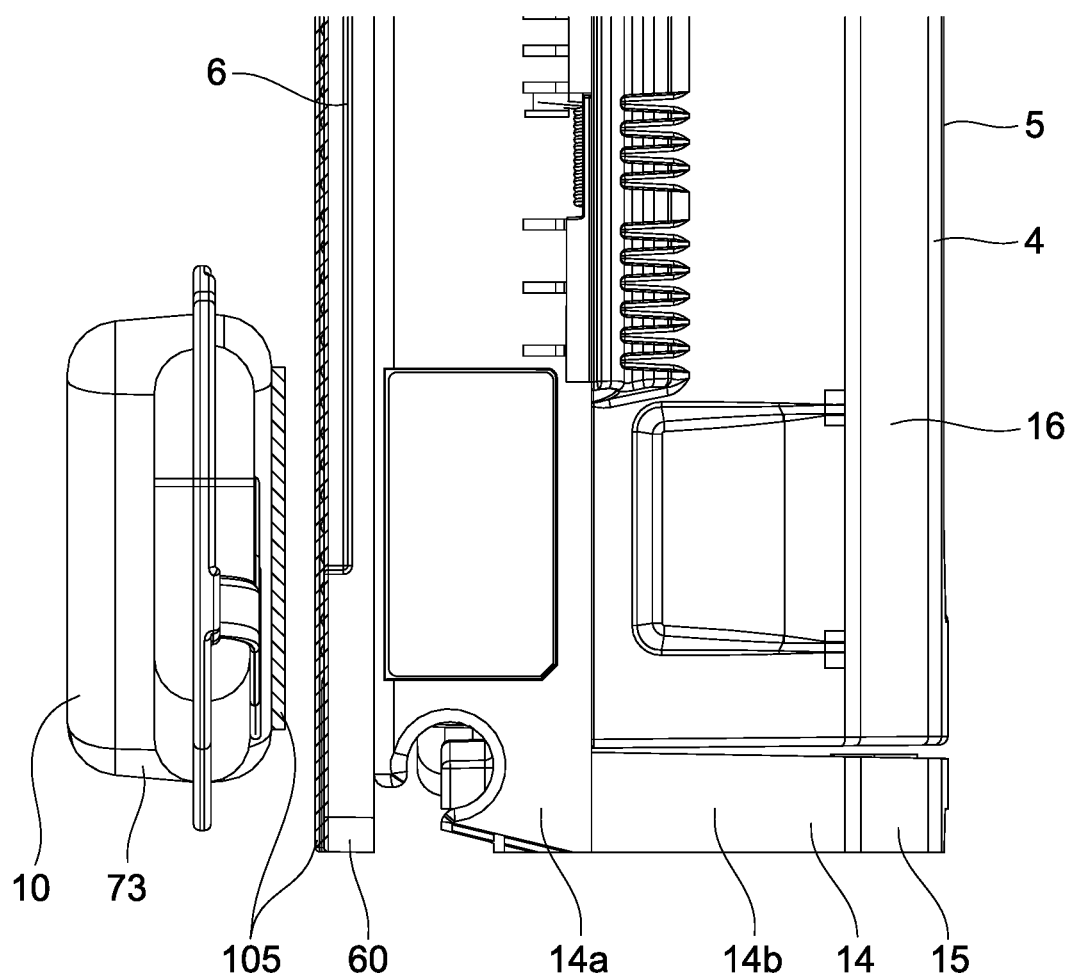
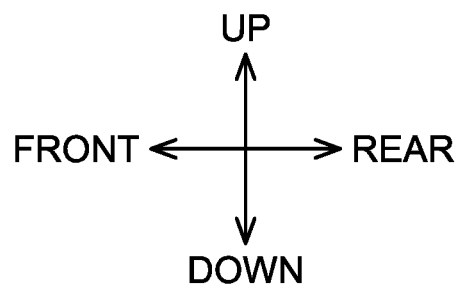

BATTERY MOUNT DEVICE

CROSS REFERENCE TO RELATED APPLICATION(S)

This application claims priority to Japanese Patent Application No. 2018-192865, filed on Oct. 11, 2018, and Japanese Patent Application No. 2018-192882, filed on Oct. 11, 2018, the entire contents of which are incorporated herein by reference.

TECHNICAL FIELD

The art disclosed herein relates to a battery mount device.

BACKGROUND

International Publication No. WO 2013/027599 A1 describes a battery mount device including a housing to which a battery pack is detachably attached and a cover attached to the housing so as to cover the battery pack and configured to open and close by rotating about a rotation axis.

SUMMARY

In a battery mount device as above, when water is splashed on the battery mount device in a state where a cover is not completely closed, a battery pack therein may become wet, which may result in failures or damages. The description herein provides an art configured to suppress a battery pack from becoming wet even when a battery mount device is splashed with water.

Further, in the battery mount device as above, when the battery pack is to be attached to or detached from a housing, a user needs to hold the cover with one hand to hold it in an open state and attach or detach the battery pack by holding it with the other hand. The description herein also provides an art that enables attaching and detaching work of a battery pack to be more simplified.

A battery mount device disclosed herein may comprise a housing to which a battery pack is detachably attached, and a cover attached to the housing so as to cover the battery pack and configured to open and close by rotating around a rotation axis. Force in a direction closing the cover may act on the cover in a state where the battery mount device is placed on a horizontal plane.

According to the above configuration, in a state where the battery mount device is placed on the horizontal plane, the force in the direction closing the cover acts on the cover, thus the cover can surely be kept closed. Due to this, even if water is splashed on the battery mount device, the battery pack can be suppressed from becoming wet with water.

Another battery mount device disclosed herein may comprise: a housing to which a battery pack is detachably attached; a cover attached to the housing so as to cover the battery pack and configured to open and close by rotating around a rotation axis; and a cover holding mechanism capable of holding the cover in an open state. The cover holding mechanism may include a cover holder configured to move, in response to an operation by a user, between a holding position where the cover holder interferes with a rotating motion of the cover and a released position where the cover holder does not interfere with the rotating motion of the cover.

According to the above configuration, the cover can be held in the open state by the cover holding mechanism upon attaching or detaching the battery pack to or from the housing, thus the user does not need to hold the cover with one hand to hold it in the open state. Attaching and detaching work of the battery pack can be performed easily.

BRIEF DESCRIPTION OF DRAWINGS

FIG. 27 is a plan view of the attaching portion of the waist belt 10 to the back-carried part 6 in the backpack type power supply device 2 according to the variant seen from a left side.

DETAILED DESCRIPTION

Figure 1:
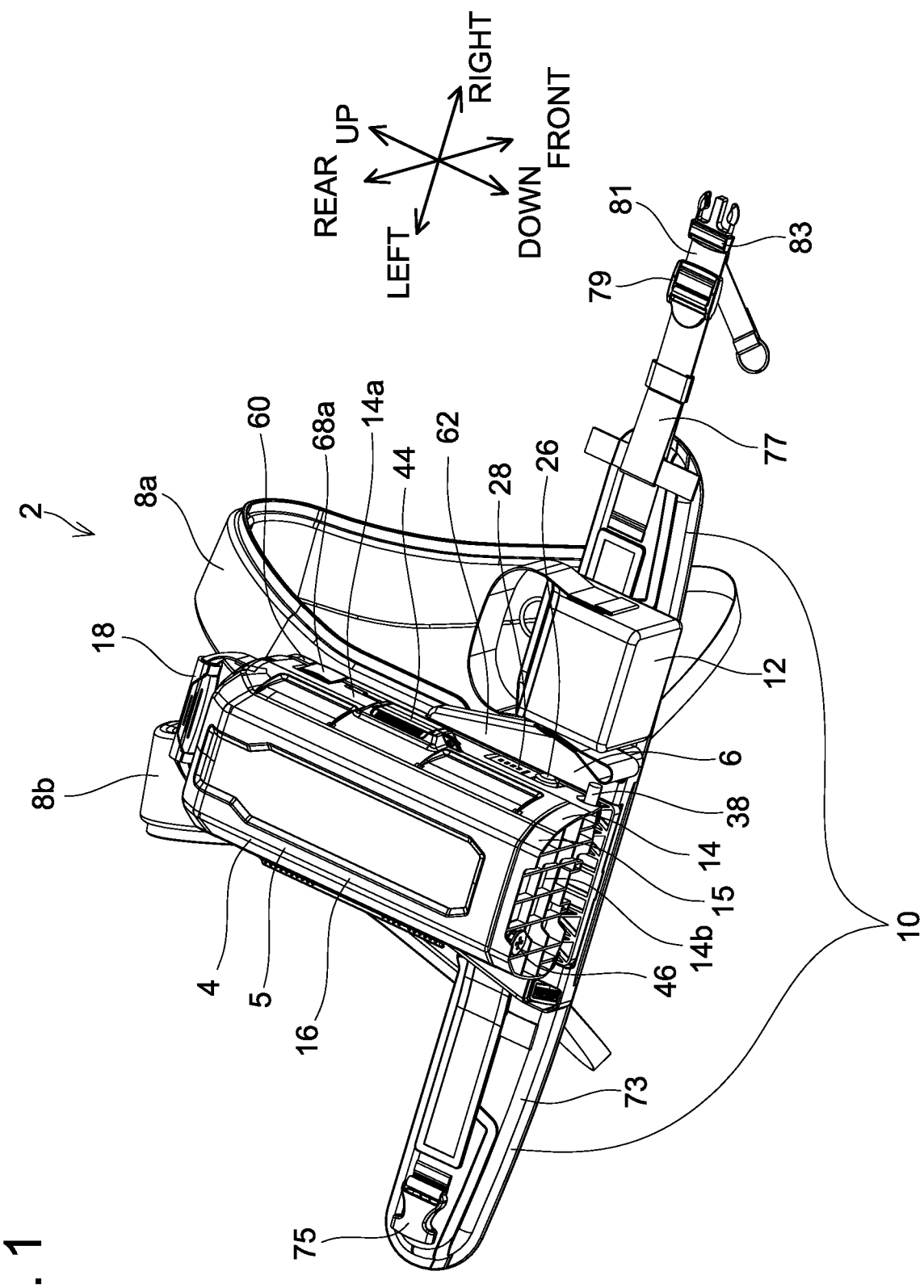
FIG. 1 is a perspective view seeing a backpack type power supply device 2 according to an embodiment from a right lower rear side.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved battery mount devices, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a battery mount device may comprise: a housing to which a battery pack is detachably attached; and a cover attached to the housing so as to cover the battery pack and configured to open and close by rotating around a rotation axis. Force in a direction closing the cover may act on the cover in a state where the battery mount device is placed on a horizontal plane.

According to the above configuration, since the force in the direction closing the cover acts on the cover in the state where the battery mount device is placed on the horizontal plane, the cover can surely be kept closed. Due to this, the battery pack can be suppressed from becoming wet even when water splashes on the battery mount device.

In one or more embodiments, the battery mount device may further comprise a sealer configured to seal a periphery of the cover when the cover is closed.

According to the above configuration, even in the case where water splashes on the battery mount device, the battery pack can surely be suppressed from becoming wet.

In one or more embodiments, the battery mount device may further comprise a biasing member configured to bias the cover in the direction closing the cover. The force in the direction closing the cover that acts on the cover in the state where the battery mount device is placed on the horizontal plane may include biasing force applied by the biasing member.

According to the above configuration, the biasing member biases the cover in the direction closing the cover even if the battery mount device is not in a placed state on a horizontal plane. Even in the case where water splashes on the battery mount device while being in the state where the battery mount device is not placed on a horizontal plane, the battery pack can be suppressed from becoming wet.

In one or more embodiments, the battery mount device may further comprise a lock mechanism configured to hold a state where the cover is closed after the cover is closed.

According to the above configuration, even in a case where force in a direction opening the cover inadvertently acts on the cover in the state where the cover is closed, the closed state of the cover can be maintained. A situation in which the battery pack becomes wet by water can surely be avoided.

In one or more embodiments, a battery mount device may comprise: a housing to which a battery pack is detachably attached; a cover attached to the housing so as to cover the battery pack and configured to open and close by rotating around a rotation axis; and a cover holding mechanism capable of holding the cover in an open state. The cover holding mechanism may include a cover holder configured to move, in response to an operation by a user, between a holding position where the cover holder interferes with a rotating motion of the cover and a released position where the cover holder does not interfere with the rotating motion of the cover.

According to the above configuration, upon attaching or detaching the battery pack onto or from the housing, the cover can be held in the open state by the cover holding mechanism, thus a user does not need to hold the cover with his/her one hand to hold it in the open state. Attaching or detaching work of the battery pack can easily be performed.

In one or more embodiments, the cover holding mechanism may further comprise a first biasing member configured to bias the cover holder from the holding position toward the released position.

According to the above configuration, after the attaching or detaching work of the battery pack has been completed, the cover holder can be returned to the released position from the holding position by the biasing force of the first biasing member.

In one or more embodiments, the battery mount device may further comprise a second biasing member configured to bias the cover in the direction closing the cover.

According to the above configuration, in a situation where the attaching or detaching work of the battery pack is not performed, the cover can surely be kept closed.

In one or more embodiments, the battery mount device may further comprise a power output configured to output power from the battery pack to another device. A shoulder belt configured to be strapped on a shoulder of a user may be configured attachable to the battery mount device According to the above configuration, a backpack type power supply device using the battery mount device can be realized.

In one or more embodiments, the rotation axis may extend along a longitudinal direction of the housing.

If the rotation axis of the cover is orthogonal to the longitudinal direction of the housing, a tip of the cover rotates on a large trajectory upon opening and closing the cover, thus it could easily interfere with a body of the user or with a surrounding object. By configuring the rotation axis to extend along the longitudinal direction of the housing as above, the tip of the cover can be rotated on a small trajectory upon opening and closing the cover, and interference with the body of the user or with the surrounding object can be suppressed from occurring.

In one or more embodiments, the battery pack may be configured attachable to and detachable from the housing by sliding in a sliding direction with respect to the housing. The sliding direction may be substantially parallel to a plane orthogonal to the rotation axis.

According to the above configuration, the cover does not interfere upon opening the cover relative to the housing and sliding the battery pack in the sliding direction relative to the housing. The attaching or detaching work of the battery pack can easily be performed.

In one or more embodiments, the battery pack may comprise a plurality of battery packs and the housing may be configured to arrange the battery packs side by side in the longitudinal direction of the housing.

According to the above configuration, upon sliding one of the battery packs in the sliding direction relative to the housing, other battery pack(s) attached to the housing do not interfere. The attaching or detaching work of the battery pack can more easily be performed.

In one or more embodiments, a cable holder may comprise a band attachment section configured to be detachably attached to a band which a user is wearing, and a cable holding section configured to detachably hold a cable. The band attachment section and the cable holding section may be configured integrally.

According to the above configuration, since the band attachment section is configured to detachably attach to the band, only the cable holder can be detached without the user having have to take off the band he/she is wearing.

In one or more embodiments, the band attachment section may include a gap, and may have a shape that surrounds a periphery of the band.

According to the above configuration, the cable holder can be detached from or attached to the band by taking out or inserting the band from or into the band attachment section through the gap.

In one or more embodiments, the band attachment section may have a cross-sectional shape that facilitates rolling. The cross-sectional shape that facilitates rolling herein may be a substantially circular shape, a substantially oval shape, a substantially square shape with rounded corners, and a polygonal shape of which corners form obtuse angles, such as a substantially hexagonal shape and a substantially octagonal shape.

According to the above configuration, when an external force in a direction of shifting the cable holder down acts on the cable holder attached to the band, the cable holder shifts down without fighting against the external force, thus the cable holder can be suppressed from being damaged.

In one or more embodiments, the cable holding section may have a shape including an opening. A width of the opening may be smaller than a cable diameter of the cable in a normal state, and may become larger than the cable diameter of the cable by elastic deformation of the cable holding section upon attaching or detaching the cable.

According to the above configuration, the cable can be detached from or attached to the cable holder by taking out or inserting the cable from or into the cable holding section through the opening. Further, according to the above configuration, when large force acts on the cable, such as when a device connected to the cable falls and the cable is thereby yanked, the cable detaches from the cable holder, and the cable separates away from the band which the user is wearing. By configuring as above, user safety can be ensured.

In one or more embodiments, the band may be provided on a shoulder belt of a backpack type power supply device. The cable may be a power cable extending from the backpack type power supply device.

According to the above configuration, the power cable extending from the backpack type power supply device is extended from a back of the user over a shoulder along a chest of the user, the power cable can be suppressed from becoming loose and sagged.

In one or more embodiments, a backpack type device may comprise a body, a shoulder belt configured to be strapped on a shoulder of a user, and a waist belt configured to be wrapped around a waist of the user. The waist belt may be configured to switch between a state in which a lower end of the waist belt is below a lower surface of the body and a state in which the lower end of the waist belt is above the lower surface of the body. The backpack type device may be configured capable of being placed on a horizontal plane with the lower surface of the body in contact with the horizontal plane on which the backpack type device is placed in the state in which the lower end of the waist belt is above the lower surface of the body.

According to the above configuration, when the user uses the backpack type device by carrying it on his/her bask, a position of the waist belt can be adjusted to a position of the waist of the user by bringing the waist belt to be in the state of having the lower end of the waist belt located below the lower surface of the body, by which a burden on a user's body can be reduced. Further, upon placing the backpack type device on a horizontal plane, the lower surface of the body can be brought into contact with the horizontal plane on which the backpack type device is placed by bringing the waist belt to be in the state of having the lower end of the waist belt located above the lower surface of the body.

In one or more embodiments, the body may comprise a main body portion, and a back carrier portion to which the main body portion is detachably attached and to which the shoulder belt and the waist belt are attached.

According to the above configuration, usage and maintenance of the main body part may be carried out in a state of having detached the main body part from the back-carried part.

In one or more embodiments, the back carrier portion may comprise: a back plate to which an upper end of the shoulder belt is attached; a support plate to which the waist belt is attached and a position of which in an up-down direction relative to the back plate is configured changeable, and a lock mechanism configured to fix the position of the support plate in the up-down direction relative to the back plate. The main body portion and/or the back plate may constitute the lower surface of the body.

According to the above configuration, the state where the lower end of the waist belt is located below the lower surface of the body and the state where the lower end of the waist belt is located above the lower surface of the body can be switched with a relatively simple configuration.

In one or more embodiments, the waist belt may be attached to the body so as to be rotatable around a rotation axis extending in a front-rear direction relative to the body. The rotation axis may be separated away from a center of the waist belt in an up-down direction.

According to the above configuration, the waist belt can be switched from the state where the lower end of the waist belt is located below the lower surface of the body to the state where the lower end of the waist belt is located above the lower surface of the body by rotating 180 degrees around the rotation axis relative to the body. The switch between the state where the lower end of the waist belt is located below the lower surface of the body and the state where the lower end of the waist belt is located above the lower surface of the body can be performed with a relatively simple configuration.

In one or more embodiments, the waist belt may be detachably attached to the body by a hook-and-loop fastener.

According to the above configuration, the state where the lower end of the waist belt is located below the lower surface of the body and the state where the lower end of the waist belt is located above the lower surface of the body can be switched by adjusting an attaching position of the waist belt in the up-down direction relative to the body. The state where the lower end of the waist belt is located below the lower surface of the body and the state where the lower end of the waist belt is located above the lower surface of the body can be switched with a relatively simple configuration.

EMBODIMENTS

A backpack type power supply device 2 shown in FIG. 1 is configured to be used in a state where a user carries it on his/her back, and is a backpack type power supply device configured to supply power to various types of electrically-powered devices. The backpack type power supply device 2 comprises a main body part 4, a back-carried part 6 detachably attached to the main body part 4, shoulder belts 8a, 8b attached to the back-carried part 6 and configured to be strapped onto user's shoulders, and a waist belt 10 attached to the back-carried part 6 and configured to be wrapped on a user's waist. The waist belt 10 has a pouch 12 for accommodating attachments (not shown) detachably attached thereto. In the below description, a front-rear direction, a left-right direction, and an up-down direction as seen from the user when the user is standing while carrying the backpack type power supply device 2 on his/her back are termed a front-rear direction, a left-right direction, and an up-down direction of the backpack type power supply device 2. Further, in the below description, the main body part 4 and the back-carried part 6 may collectively be termed a body 5.

Figure 2:
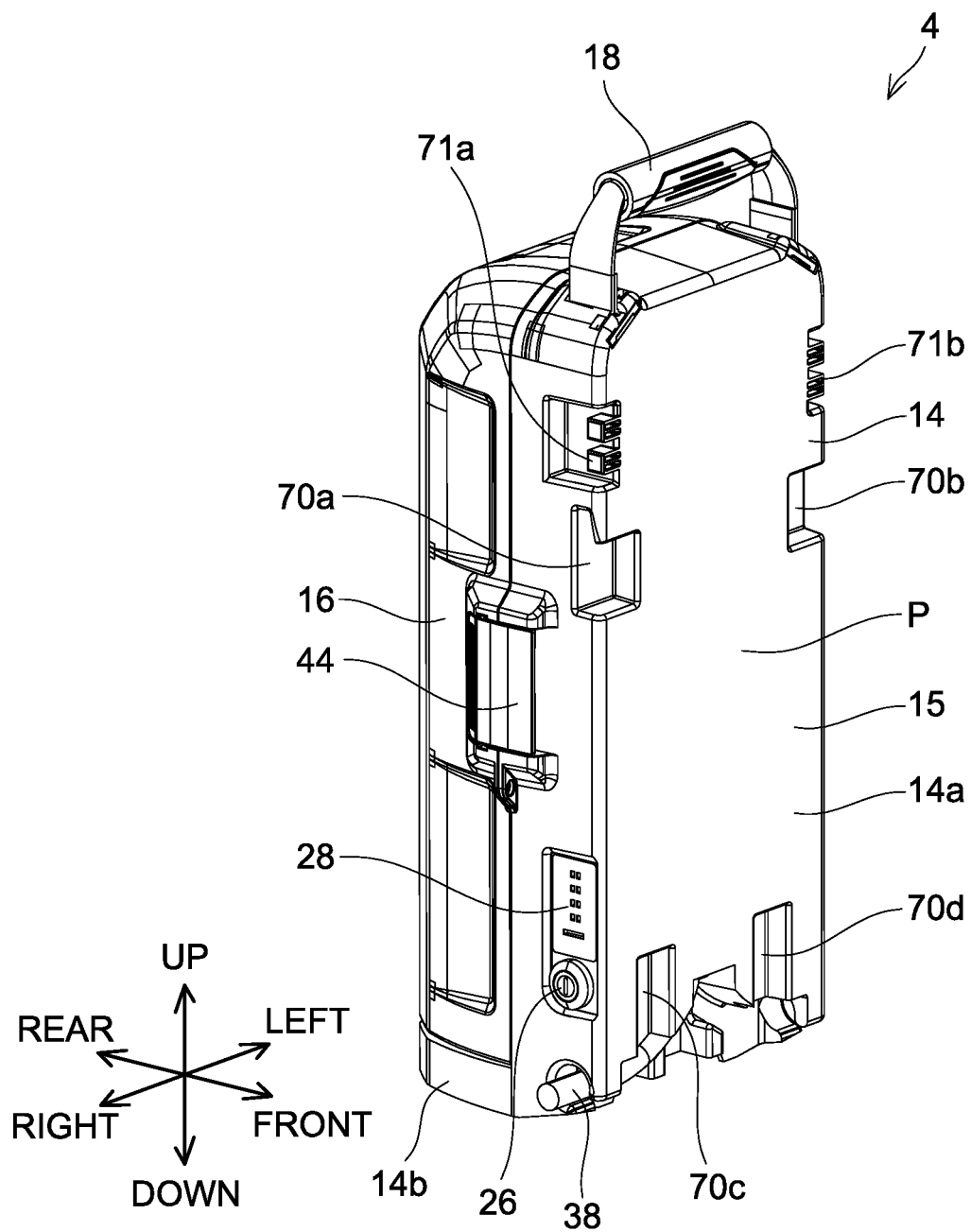
FIG. 2 is a perspective view seeing a main body part 4 of the backpack type power supply device 2 according to the embodiment from a right upper front side.

As shown in FIG. 2, the main body part 4 has a substantially rectangular shape with its longitudinal direction along the up-down direction and its short direction along the front-rear direction. The main body part 4 is provided with a coupling surface P disposed at a front end and arranged substantially orthogonal to the front-rear direction. The main body part 4 is attached to the back-carried part 6 via the coupling surface P.

Figure 3:
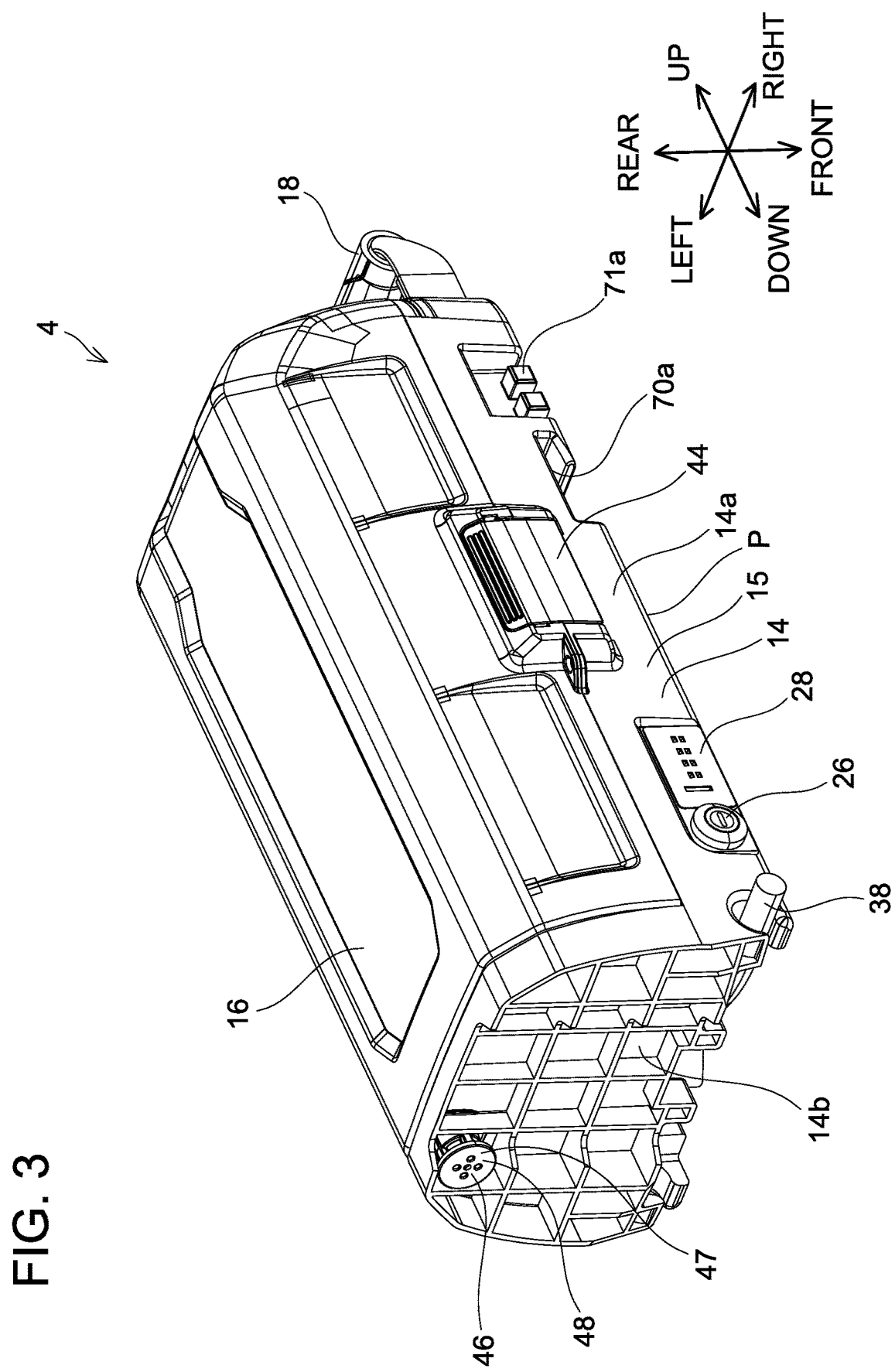
FIG. 3 is a perspective view seeing the main body part 4 of the backpack type power supply device 2 according to the embodiment from the right lower rear side.

As shown in FIG. 3, in a state of being detached from the back-carried part 6, the main body part 4 may be placed on a horizontal plane by bringing the coupling surface P into contact with the horizontal plane such as a ground surface (not shown). The main body part 4 is provided with a frame 14, a cover 16, and a handle 18. The cover 16 is attached to the frame 14 so as to be rotatable around a rotation axis extending in the up-down direction in a vicinity of a left end of the frame 14. The handle 18 is detachably attached in a vicinity of an upper end of the frame 14. The user can grip onto the handle 18 to carry the main body part 4.

Figure 4:
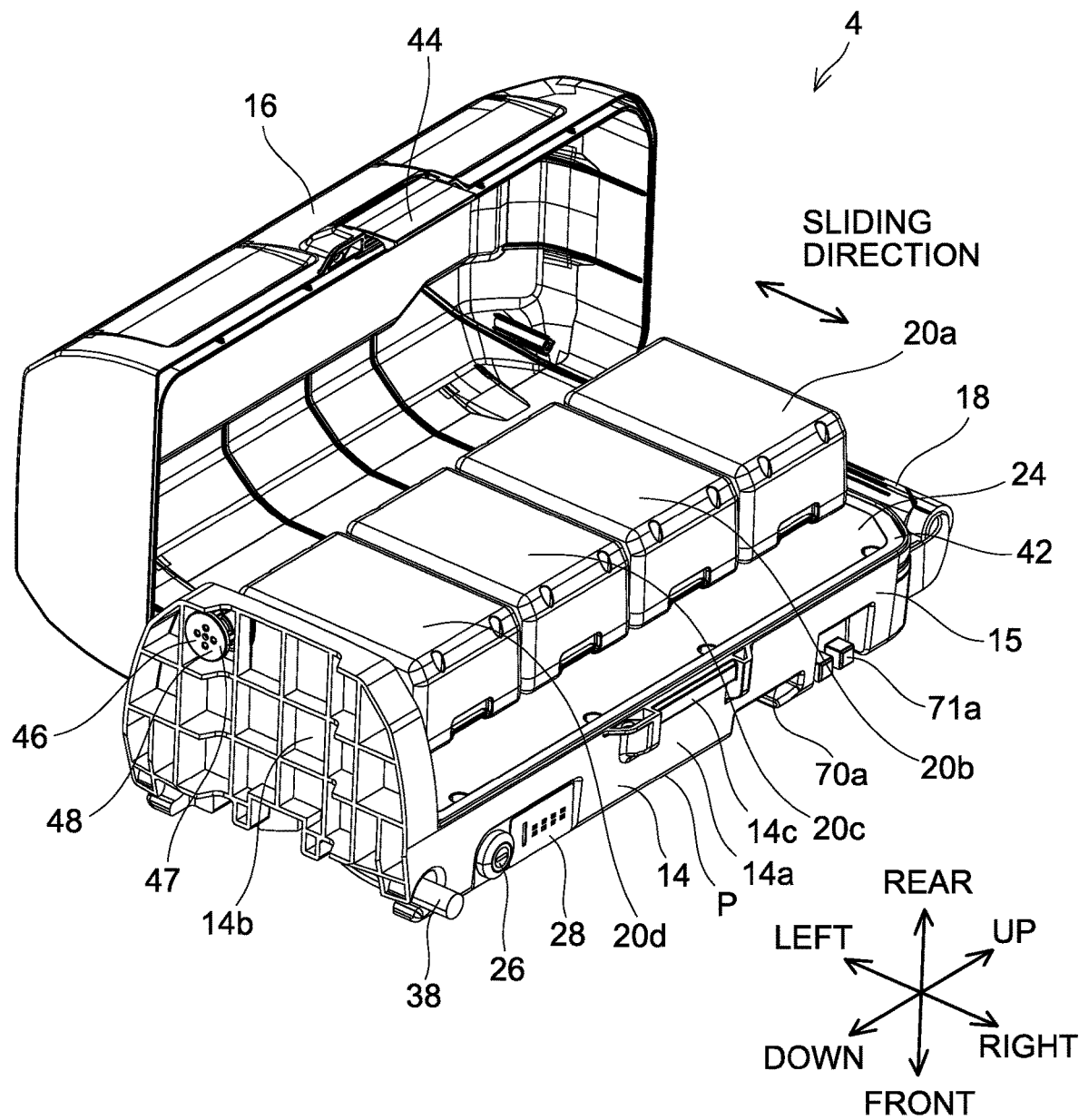
FIG. 4 is a perspective view seeing the main body part 4 of the backpack type power supply device 2 according to the embodiment from the right lower rear side with a cover 16 in an open state.

As shown in FIG. 4, a plurality of battery packs 20a, 20b, 20c, 20d is accommodated inside the main body part 4. Each of the battery packs 20a, 20b, 20c, 20d includes a secondary battery cell such as a lithium ion battery cell (not shown), and is configured rechargeable by a charger (not shown). Each of the battery packs 20a, 20b, 20c, 20d has a rated voltage of 18V and a rated capacity of 6.0 Ah, for example. The battery packs 20a, 20b, 20c, 20d are slidable battery packs configured capable of being attached or detached by sliding along a predetermined sliding direction relative to battery receptacles 22a, 22b, 22c, 22d (see FIG. 5) of the main body part 4. The sliding direction of the battery packs 20a, 20b, 20c, 20d is along the left-right direction, for example. In this case, when the battery packs 20a, 20b, 20c, 20d are to be attached, the battery packs 20a, 20b, 20c, 20d are slid leftward relative to the battery receptacles 22a, 22b, 22c, 22d, and when the battery packs 20a, 20b, 20c, 20d are to be detached, the battery packs 20a, 20b, 20c, 20d are slid rightward relative to the battery receptacles 22a, 22b, 22c, 22d. Since the rotation axis of the cover 16 is arranged in the vicinity of the left end of the frame 14, the cover 16 is located at a left rear side of the battery receptacles 22a, 22b, 22c, 22d in an open state of the cover 16. Due to this, the opened cover 16 does not interfere with attachment or detachment of the battery packs 20a, 20b, 20c, 20d.

Figure 5:
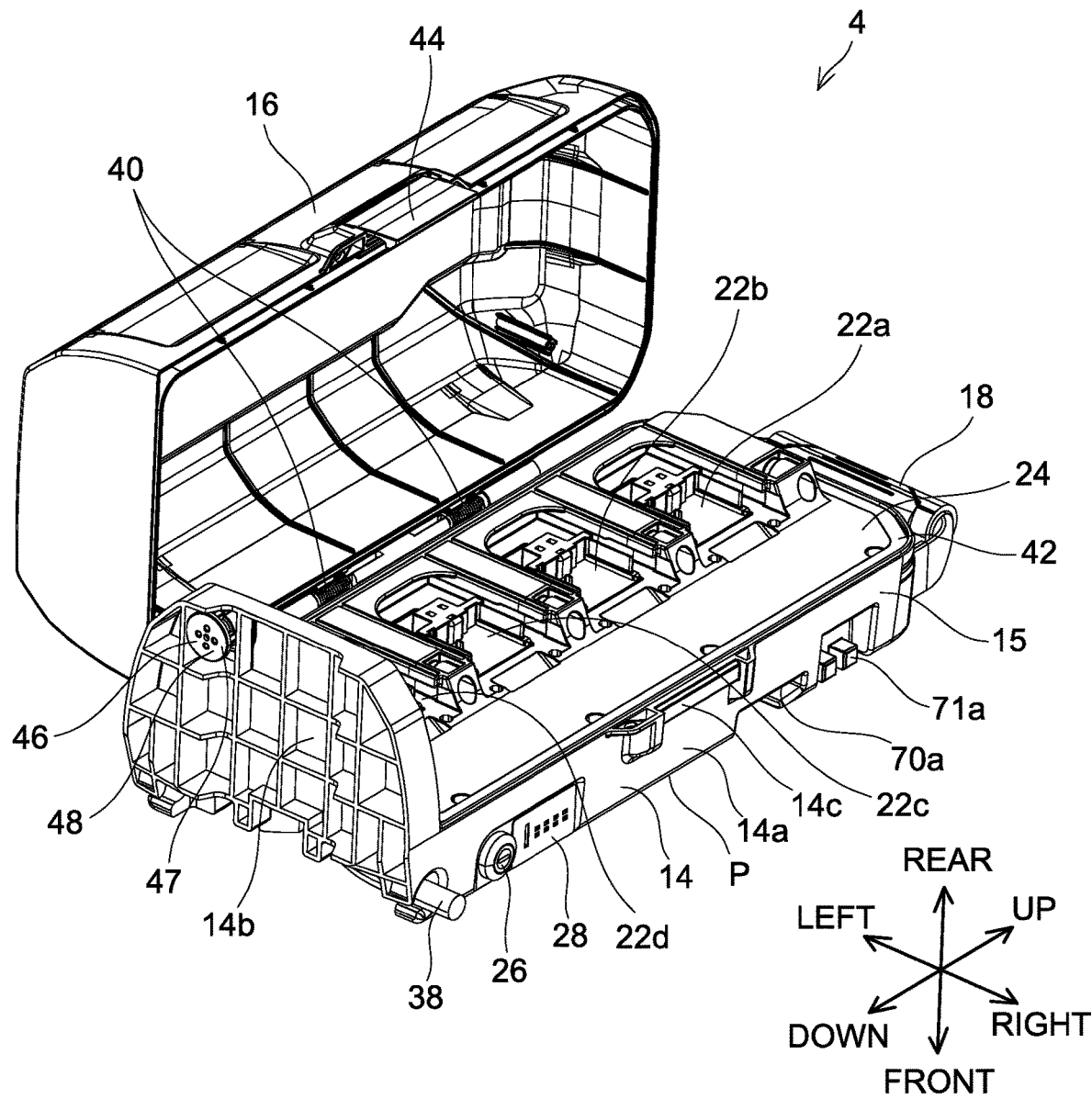
FIG. 5 is a perspective view seeing the main body part 4 of the backpack type power supply device 2 according to the embodiment from the right lower rear side with the cover 16 opened and in a state where battery packs 20a, 20b, 20c, 20d are detached.

As shown in FIG. 5, the frame 14 is provided with a box-shaped base portion 14a having its bottom surface along the coupling surface P and being opened rearward, and a support portion 14b protruding rearward in a wall shape from a lower end of the base portion 14a. The base portion 14a is provided with an inner housing 24 having a shape that covers the opening. The battery receptacles 22a, 22b, 22c, 22d are provided on a rear surface of the inner housing 24. Further, an operation portion 26 and a display portion 28 are provided at a lower portion of a right side surface of the base portion 14a. The operation portion 26 is configured to accept operations by the user to the backpack type power supply device 2, such as an operation to turn on or turn off main power. The display portion 28 is configured to present information related to a state of the backpack type power supply device 2 to the user, such as information related to remaining charges of the battery packs 20a, 20b, 20c, 20d attached to the battery receptacles 22a, 22b, 22c, 22d, for example. In the following description, the frame 14, the inner housing 24, and the battery receptacles 22a, 22b, 22c, 22d may collectively be termed a housing 15.

Figure 6:
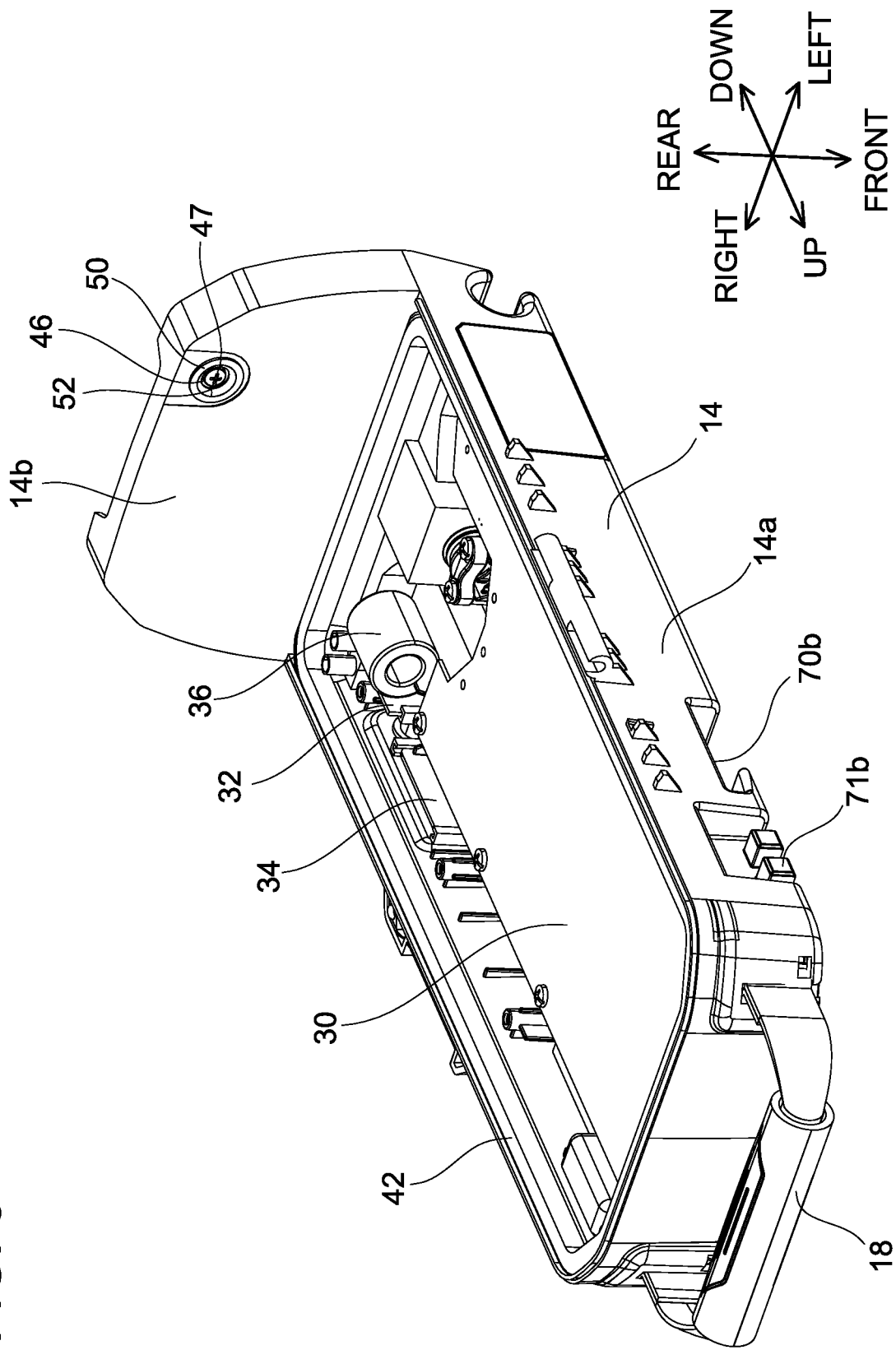
FIG. 6 is a perspective view seeing the main body part 4 of the backpack type power supply device 2 according to the embodiment from a left upper front side in a state where the cover 16, the battery packs 20a, 20b, 20c, 20d, and an inner housing 24 are detached.

As shown in FIG. 6, a control board 30, an operation board 32, a display board 34, and a noise filter 36 are accommodated inside the base portion 14a. The control board 30 is electrically connected to the battery packs 20a, 20b, 20c, 20d attached to the battery receptacles 22a, 22b, 22c, 22d. The control board 30 is configured to adjust power supplied from the battery packs 20a, 20b, 20c, 20d to a desired output voltage and supply the same to a power cable 38 (see FIG. 2). The control board 30 is configured to supply power with a rated voltage of 36V to the power cable 38 by connecting a serial connection of the battery packs 20a, 20b and a serial connection of the battery packs 20c, 20d in parallel, for example. Alternatively, the control board 30 may be configured to supply power with the rated voltage of 18V to the power cable 38 by connecting the battery packs 20a, 20b, 20c, 20d in parallel. The operation board 32 and the display board 34 are connected to the control board 30. The operation board 32 is configured to detect an operation performed on the operation portion 26 by the user and output the same to the control board 30. The display board 34 is configured to perform display on the display portion 28 according to instructions from the control board 30. The noise filter 36 is configured to suppress noise from being superposed on an output to the power cable 38. As shown in FIG. 2, the power cable 38 extends downward from a vicinity of the lower end of the base portion 14a, then curves rightward or leftward (rightward in the example of FIG. 2), and is drawn out to exterior from a right side surface or a left side surface (the right side surface in the example of FIG. 2) of the base portion 14a.

As shown in FIG. 5, the cover 16 is provided with a torsion spring 40. The torsion spring 40 is configured to bias the cover 16 in a closing direction relative to the frame 14. Further, in a state where the main body part 4 is placed on a horizontal plane with the coupling surface P contacting the horizontal plane, gravity that acts on the cover 16 acts on the cover 16 as force in the direction of closing the cover 16. The base portion 14a is provided with a sealer 42 at a portion that contacts a periphery of the cover 16 when the cover 16 is closed. The sealer 42 is a rubber packing, for example. The cover 16 is provided with a latch member 44 which the user can operate. In the state where the cover 16 is closed, the latch member 44 engages with a latch receiver 14c of the base portion 14a to hold the cover 16 in the closed state. Instead of the latch member 44 and the latch receiver 14c, the state in which the cover 16 is closed may be maintained by a permanent magnet (not shown) provided on one of the cover 16 and the base portion 14a and a magnetic body (not shown) provided on the other of the cover 16 and the base portion 14a.

Instead of the torsion spring 40, the cover 16 may be biased in the closing direction relative to the frame 14 by a tension spring (not shown) having one end rotatably retained on the cover 16 and another end rotatable retained on the frame 14.

Figure 7:
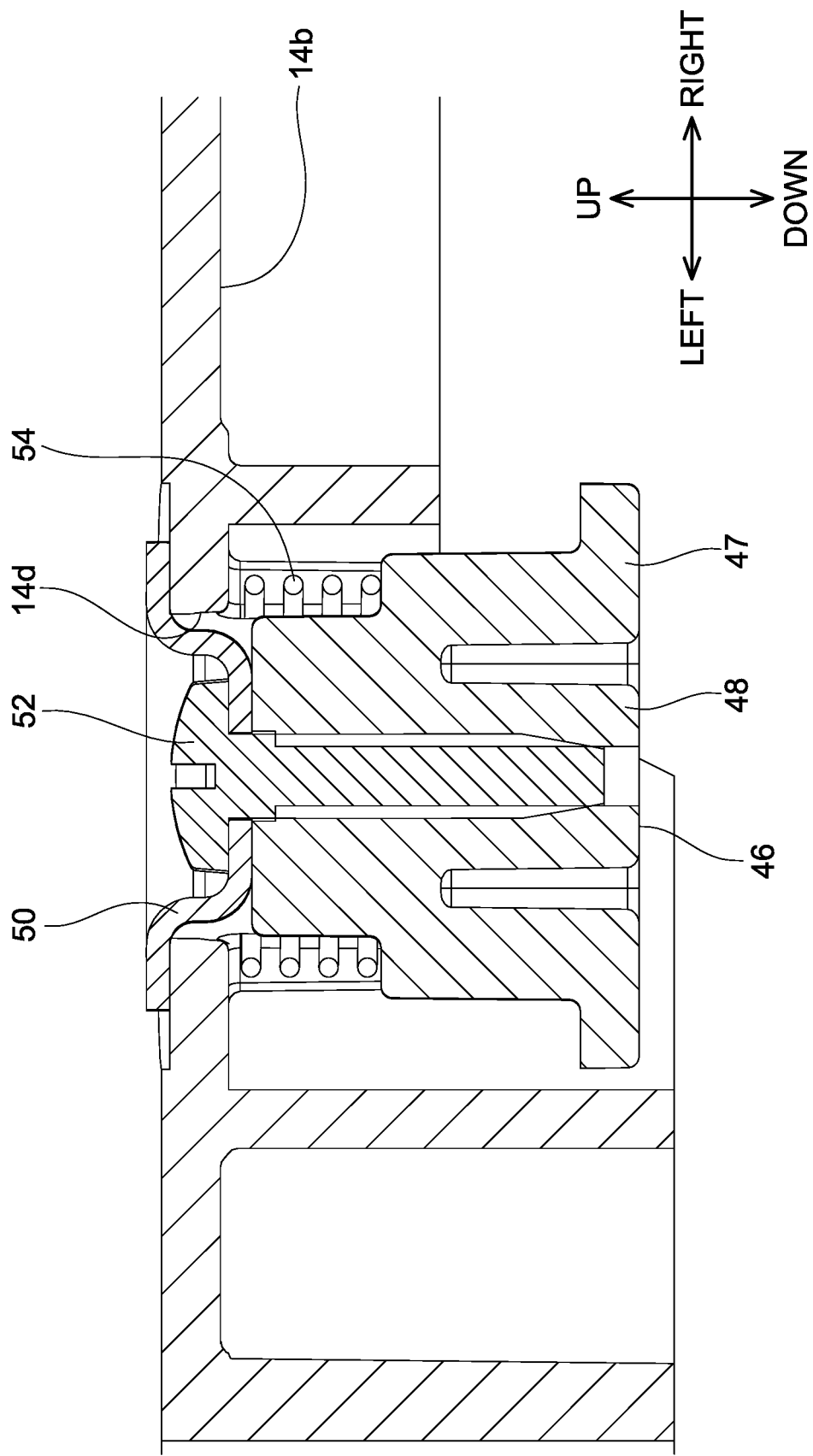
FIG. 7 is a cross-sectional view of a cover holding mechanism 46 of the backpack type power supply device 2 according to the embodiment.

The support portion 14b is provided with a cover holding mechanism 46. As shown in FIG. 7, the cover holding mechanism 46 is attached to a through hole 14d provided in the support portion 14b. The cover holding mechanism 46 is provided with a button 48 arranged below the support portion 14b, an engaging piece 50 arranged above the support portion 14b, a screw 52 inserted in the through hole 14d and fixing the button 48 and the engaging piece 50 to each other, and a compression spring 54 biasing the button 48 downward relative to the support portion 14b. In the following description, the button 48, the engaging piece 50, and the screw 52 may collectively be termed a cover holder 47.

Figure 8:
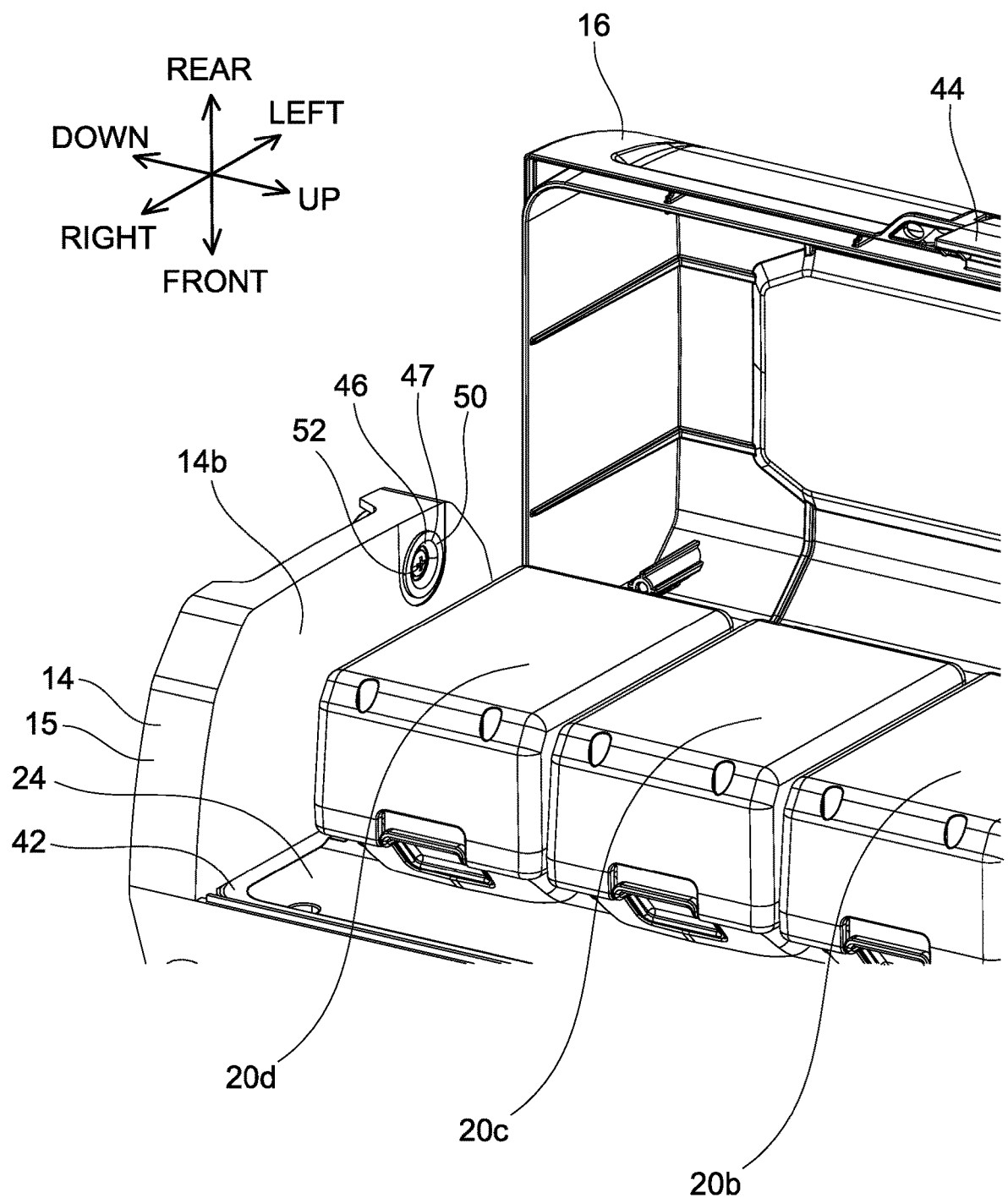
FIG. 8 is a perspective view seeing a cover holder 47 in a released position in the main body part 4 of the backpack type power supply device 2 according to the embodiment from a right upper rear side.
Figure 9:
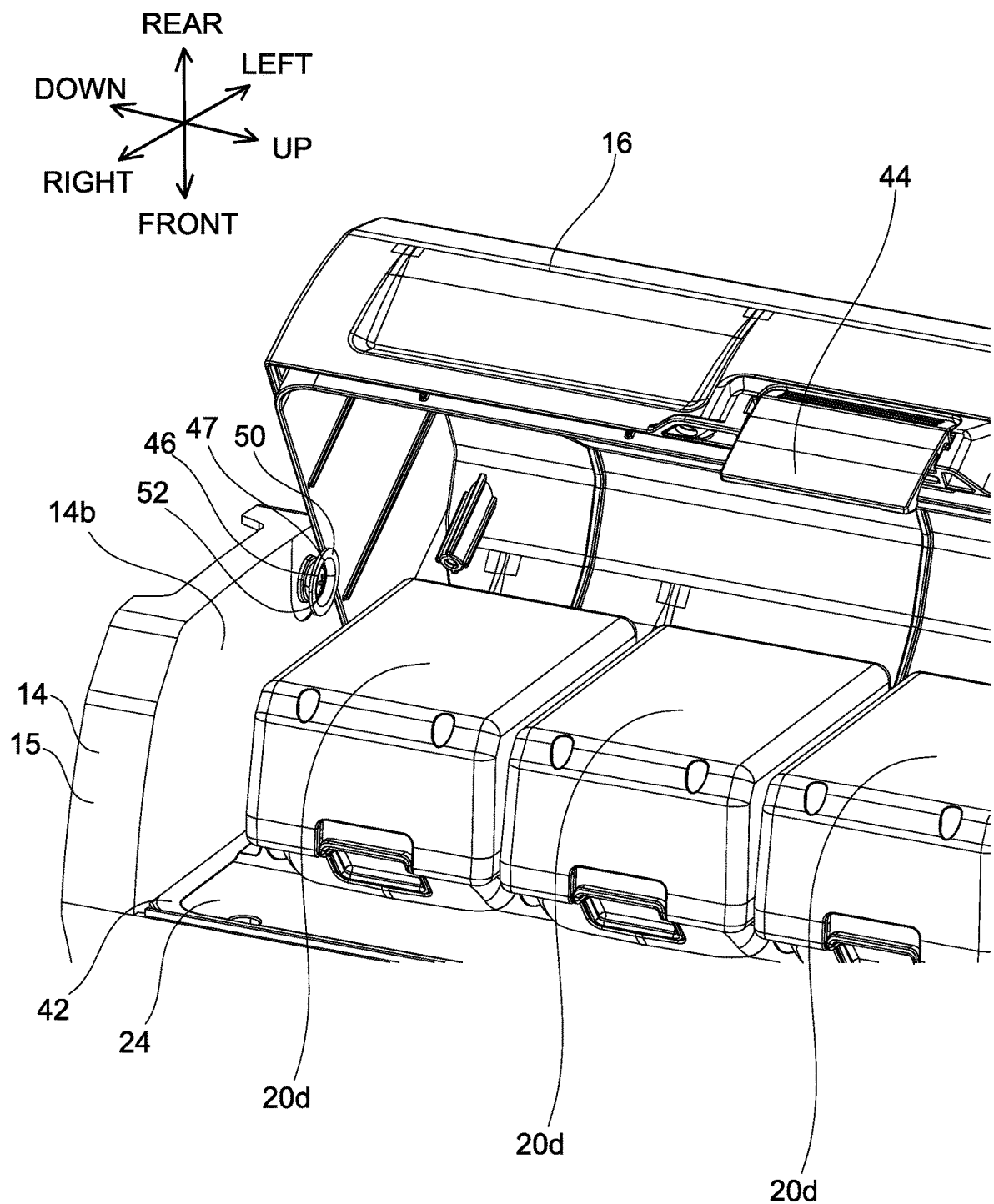
FIG. 9 is a perspective view seeing the cover holder 47 in a holding position in the main body part 4 of the backpack type power supply device 2 according to the embodiment from the right upper rear side.

As shown in FIG. 8, in a normal state, the button 48 is biased downward by the compression spring 54 in the cover holding mechanism 46, thus the engaging piece 50 is arranged at a positions that does not interfere with opening and closing operations of the cover 16 (hereinbelow may be termed a released position). When the cover 16 is in the open state and further the user pushes in the button 48 of the cover holding mechanism 46 upward, the engaging piece 50 comes to be arranged at a position interfering with the opening and closing operations of the cover 16 (which may be termed a holding position) as shown in FIG. 9. In this state, the cover 16 engages with the engaging piece 50 even when the force in the closing direction is acting on the cover 16, so the cover 16 can be held in the open state even if the user releases his/her hands from the cover 16 and the button 48. From the state shown in FIG. 9, when the user holds the cover 16 to rotate it in the opening direction in a state of having his/her hands released from the button 48, engagement of the cover 16 and the engaging piece 50 is released. In this case, as shown in FIG. 8, the engaging piece 50 moves again to the released position that does not interfere with the opening and closing operations of the cover 16 by the biasing force of the compression spring 54.

Figure 23:
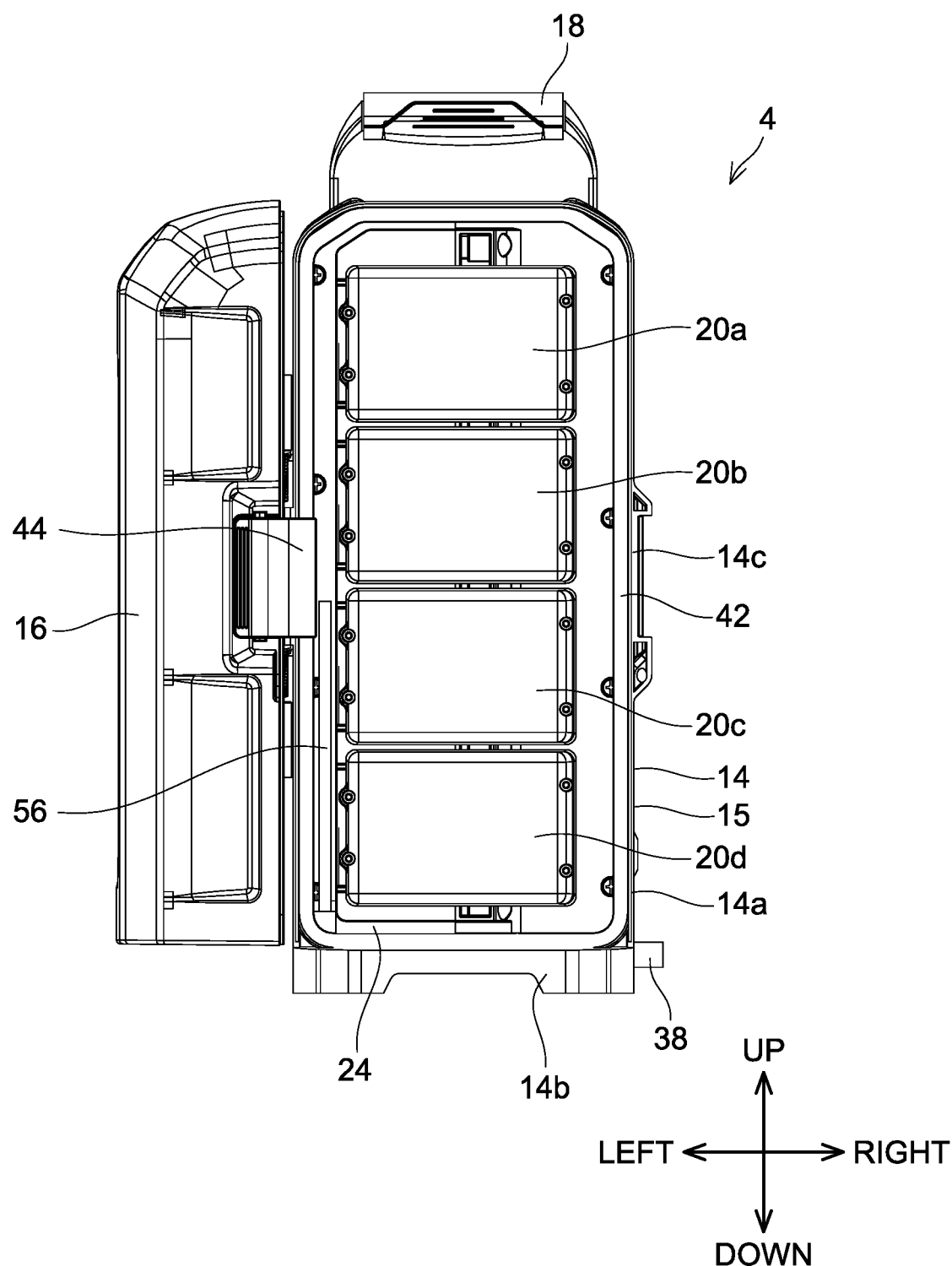
FIG. 23 is a plan view seeing a main body part 4 of a backpack type power supply device 2 according to a variant from a rear side in a state where a support rod 56 is shifted down.
Figure 24:
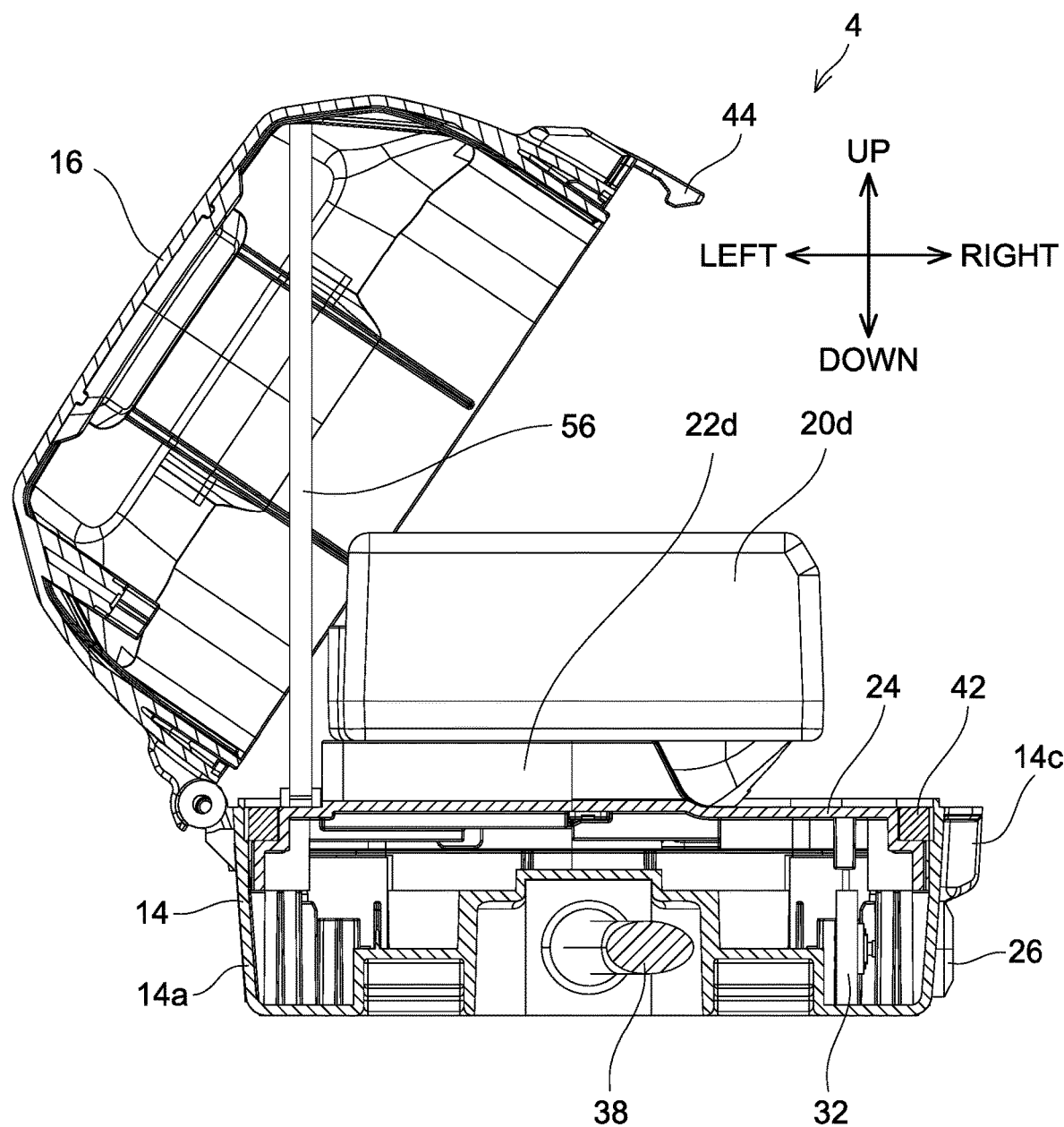
FIG. 24 is a cross-sectional view of the main body part 4 of the backpack type power supply device 2 according to the variant in a state of having shifted the support rod 56 up and brought it into contact with a cover 16.

Instead of the cover holding mechanism 46, a support rod 56 shown in FIGS. 23 and 24 may be provided. A lower end of the support rod 56 is attached to the inner housing 24 so as to be rotatable around a rotation axis that is along the left-right direction. As shown in FIG. 23, in the normal state, the support rod 56 is in a reclined state, thus the support rod 56 does not interfere with the opening and closing operations of the cover 16. When the user further pulls up the support rod 56 in the state where the cover 16 is open, the support rod 56 comes to be arranged at a position interfering with the opening and closing operations of the cover 16 as shown in FIG. 24. In this state, even if the force in the closing direction is acting on the cover 16, since the cover 16 is in contact with the support rod 56, the cover 16 can be held in the open state even when the user releases his/her hands from the cover 16 and the support rod 56.

Figure 10:
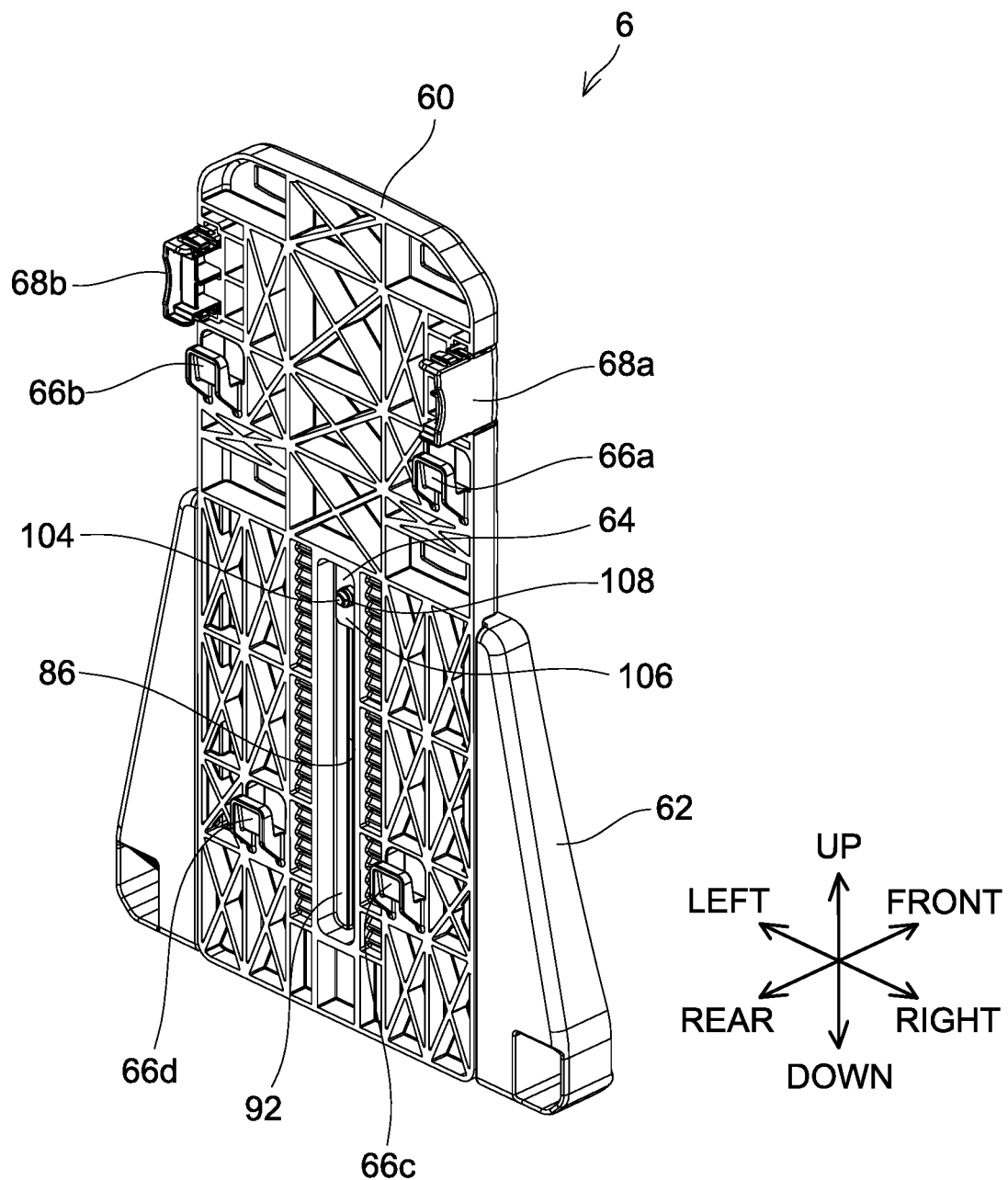
FIG. 10 is a perspective view seeing a back-carried part 6 of the backpack type power supply device 2 according to the embodiment from the right upper rear side.
Figure 11:
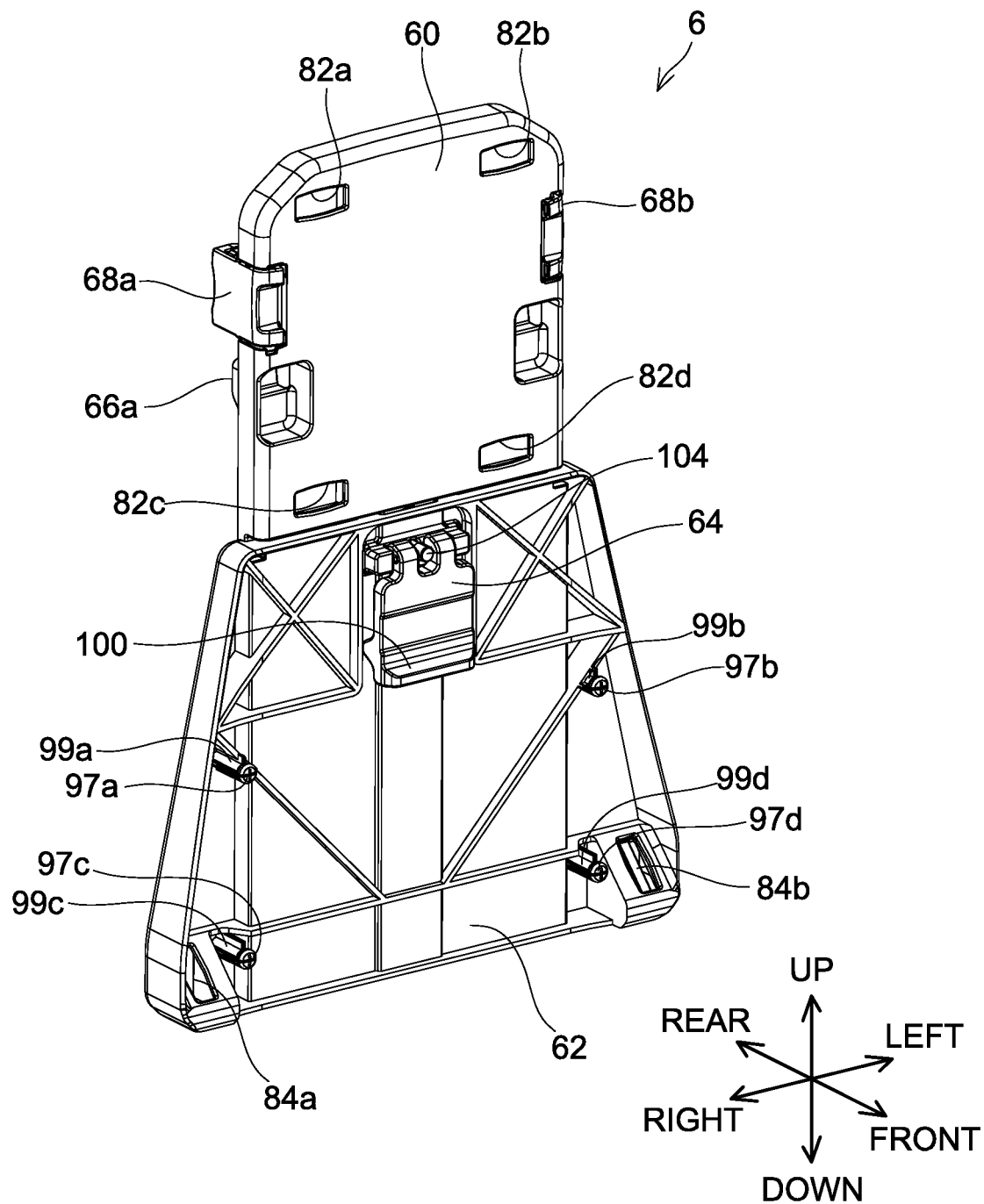
FIG. 11 is perspective view seeing the back-carried part 6 of the backpack type power supply device 2 according to the embodiment from the right upper front side.

As shown in FIGS. 10 and 11, the back-carried part 6 is provided with a back plate 60, a support plate 62, and a lock mechanism 64. As shown in FIG. 10, a rear surface of the back plate 60 is provided with a plurality of engaging protrusions 66a, 66b, 66c, 66d. The engaging protrusions 66a, 66b, 66c, 66d protrude rearward from the rear surface of the back plate 60, and have a shape that is bent upward. Further, latches 68a, 68b which the user can operate are provided at upper portions of left and right side surfaces of the back plate 60. As shown in FIG. 2, the coupling surface P of the frame 14 of the main body part 4 is provided with a plurality of engaging grooves 70a, 70b, 70c, 70d arranged at positions and having shapes corresponding to the engaging protrusions 66a, 66b, 66c, 66d. Further, latch receivers 71a, 71b corresponding to the latches 68a, 68b are provided at upper portions of the left and right side surfaces of the frame 14 of the main body part 4. When the main body part 4 is to be attached to the back-carried part 6, the engaging protrusions 66a, 66b, 66c, 66d of the back-carried part 6 are engaged with the engaging grooves 70a, 70b, 70c, 70d of the main body part 4 and further the latches 68a, 68b are engaged with the latch receivers 71a, 71b to fix the main body part 4 to the back-carried part 6.

Figure 12:
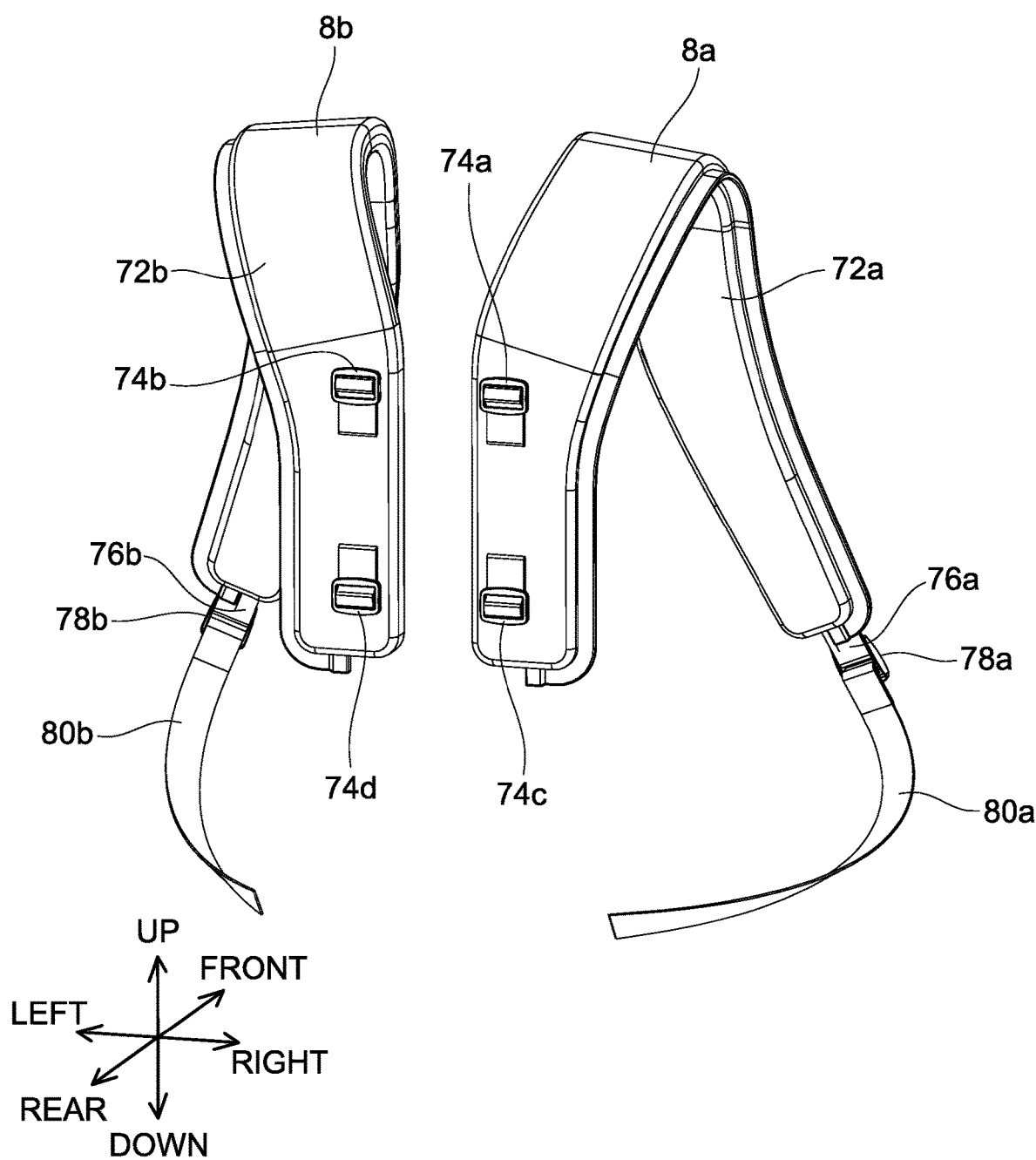
FIG. 12 is a perspective view seeing shoulder belts 8a, 8b of the backpack type power supply device 2 according to the embodiment from the right upper rear side.

As shown in FIG. 12, the shoulder belts 8a, 8b are provided with: pads 72a, 72b that come into contact with the back, shoulders, and chest of the user; engagement buckles 74a, 74b, 74c, 74d provided on rear surfaces at rear portions of the pads 72a, 72b; holding bands 76a, 76b provided on front surfaces of front portions of the pads 72a, 72b; adjustment buckles 78a, 78b retained by the holding bands 76a, 76b; and adjustment bands 80a, 80b having their upper ends attached to the adjustment buckles 78a, 78b. As shown in FIG. 11, the back plate 60 includes engagement holes 82a, 82b, 82c, 82d with which the engagement buckles 74a, 74b, 74c, 74d of the shoulder belts 8a, 8b are to be engaged. The support plate 62 includes belt attachment portions 84a, 84b to which lower ends of the adjustment bands 80a, 80b of the shoulder belts 8a, 8b are to be attached.

Figure 13:
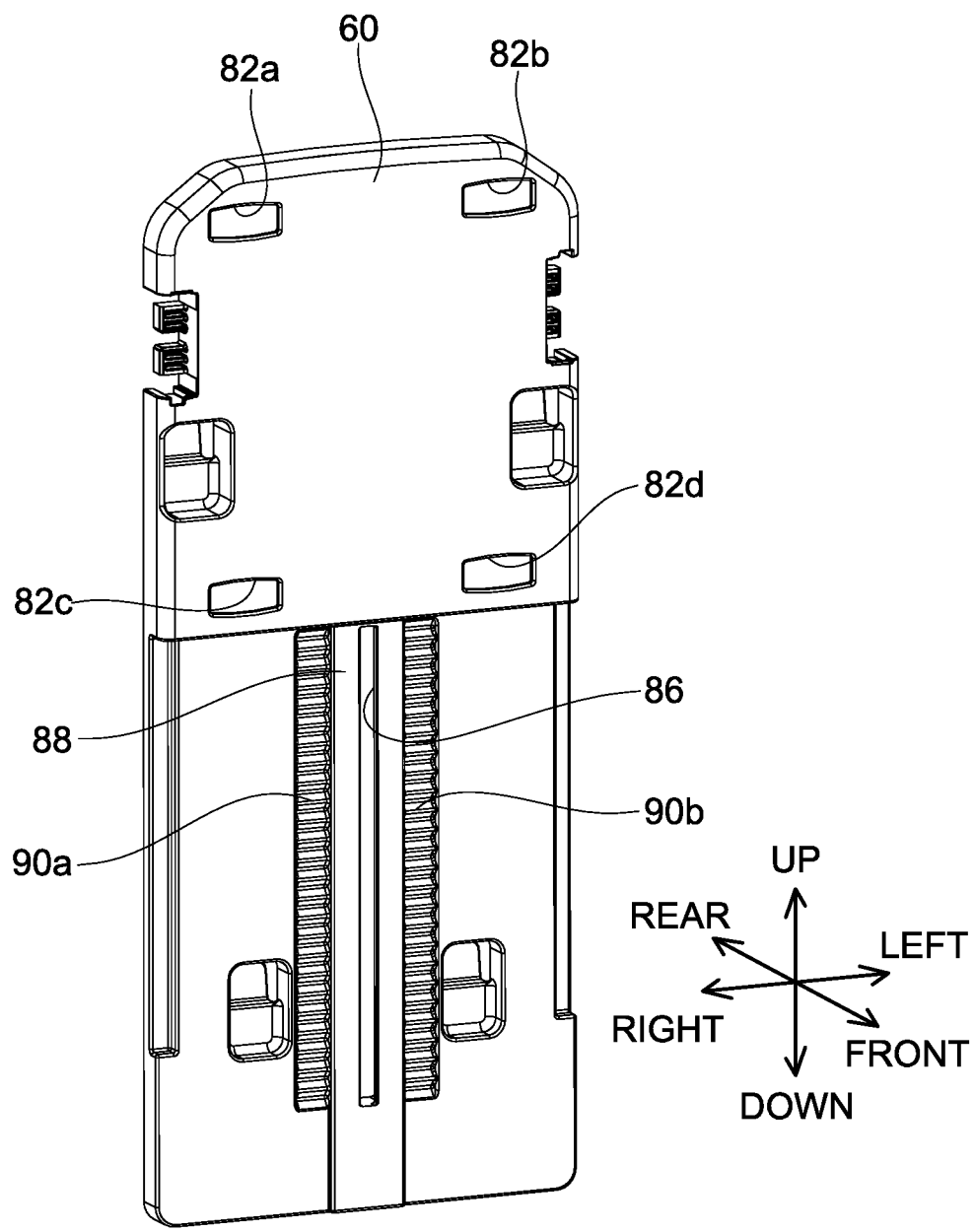
FIG. 13 is a perspective view seeing a back plate 60 of the back-carried part 6 of the backpack type power supply device 2 according to the embodiment from the right upper front side.

As shown in FIG. 13, the back plate 60 includes an elongated hole 86 penetrating from a front surface to a rear surface of the back plate 60 and having a longitudinal direction along the up-down direction. Further the front surface of the back plate 60 is provided with a guide protrusion 88 extending in the up-down direction and engagement receiving portions 90a, 90b arranged on left and right of the guide protrusion 88 and having a saw teeth-like shape in the up-down direction. Further as shown in FIG. 10, the rear surface of the back plate 60 includes a guide groove 92 at a periphery of the elongated hole 86.

Figure 14:
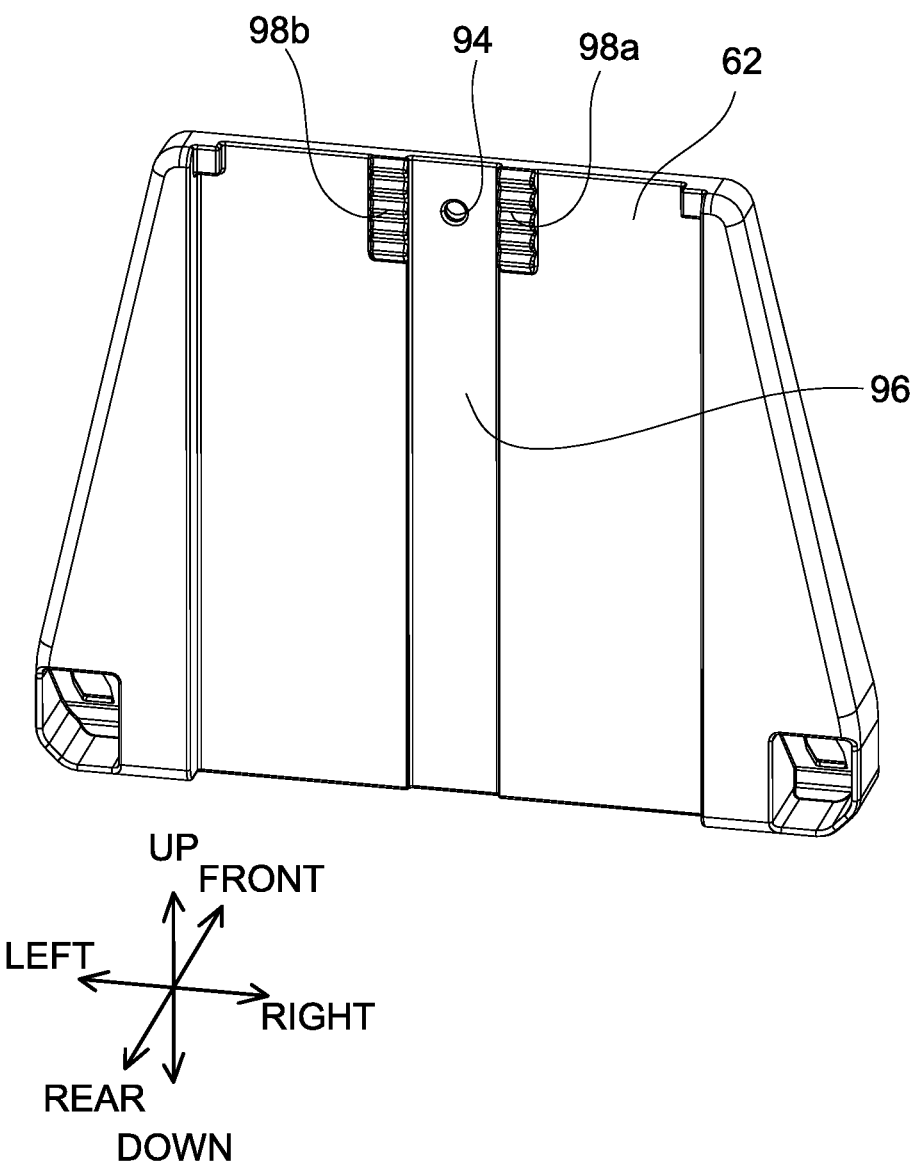
FIG. 14 is a perspective view seeing a support plate 62 of the back-carried part 6 of the backpack type power supply device 2 according to the embodiment from the right upper rear side.

As shown in FIG. 14, the support plate 62 includes a through hole 94 penetrating from a front surface to a rear surface of the support plate 62. Further, the rear surface of the support plate 62 is provided with a guide recess 96 extending in the up-down direction at a position and with a shape corresponding to those of the guide protrusion 88 of the back plate 60. Further, the rear surface of the support plate 62 is provided with engagement portions 98a, 98b having a saw teeth-like shape at positions and with the shape corresponding to those of the engagement receiving portions 90a, 90b of the back plate 60. In a state where the support plate 62 is attached to the back plate 60, the engagement portions 98a, 98b are engaged with the engagement receiving portions 90a, 90b.

As shown in FIG. 1, the waist belt 10 is provided with a pad 73 that comes into contact with the waist of the user, a receiving buckle 75 provided in a vicinity of a left end of the pad 73, a holding band 77 provided in a vicinity of a right end of the pad 73, an adjustment buckle 79 held by the holding band 77, an adjustment band 81 held by the adjustment buckle 79, and an inserting buckle 83 provided on the adjustment band 81 and configured to engage with the receiving buckle 75. As shown in FIG. 11, bosses 99a, 99b, 99c, 99d for fixing the pad 73 of the waist belt 10 by screws 97a, 97b, 97c, 97d are provided on the front surface of the support plate 62.

Figure 15:
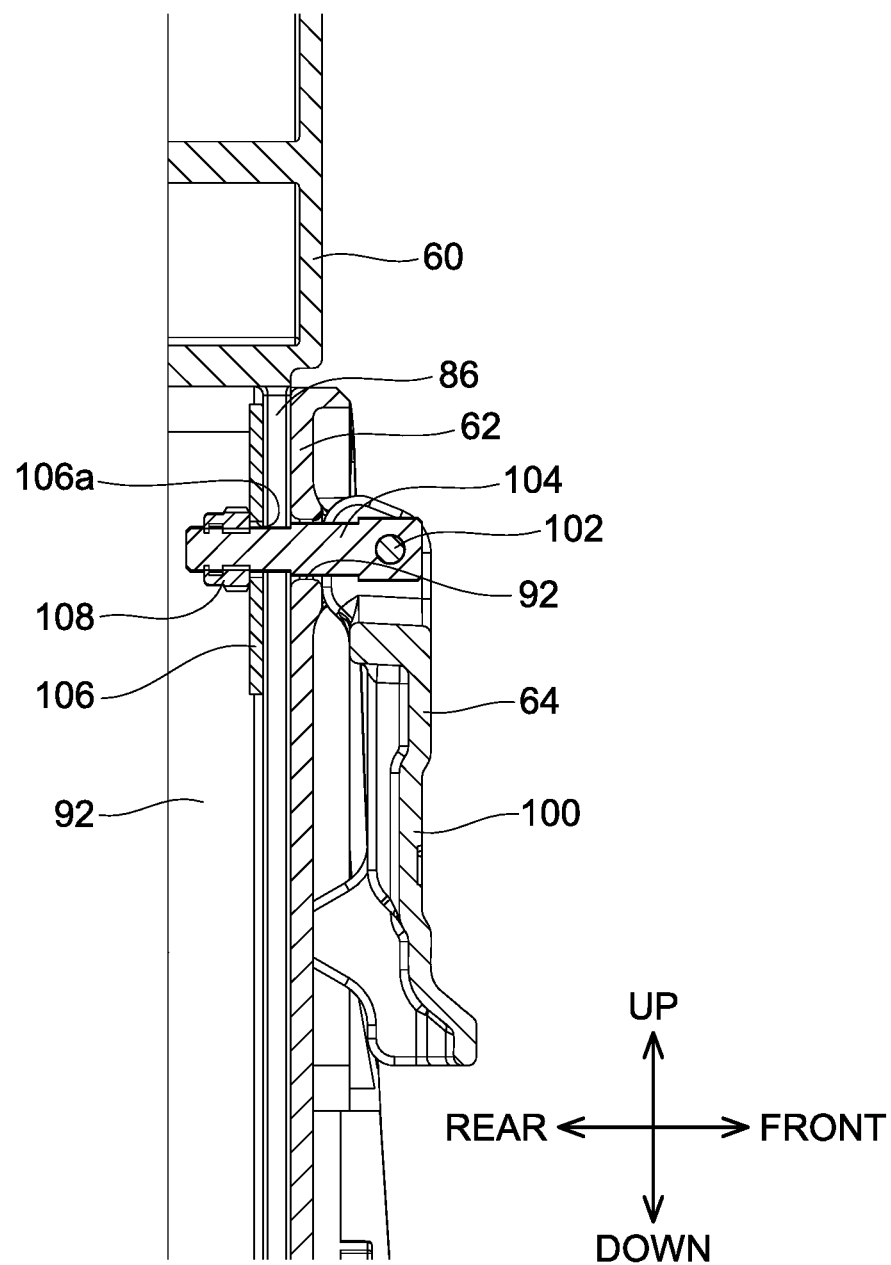
FIG. 15 is a cross-sectional view of a lock mechanism 64 of the back-carried part 6 of the backpack type power supply device 2 according to the embodiment in a state of having rotated the lock mechanism 64 downward.

As shown in FIG. 15, the lock mechanism 64 is provided with a lock lever 100, a hinge pin 102, a support pin 104, a plate 106, and a nut 108. As shown in FIG. 11, the lock lever 100 is arranged forward than the support plate 62. The lock lever 100 has a substantially flat plate shape. As shown in FIG. 15, the lock lever 100 is supported by the hinge pin 102 in a vicinity of its upper end. The lock lever 100 is configured to rotate with the hinge pin 102 as its rotation axis. The vicinity of the upper end of the lock lever 100 has a cam shape in which a protruding degree of a surface facing the support plate 62 changes according to a rotating angle. The hinge pin 102 is arranged with its longitudinal direction along the left-right direction. The hinge pin 102 is rotatably supported on the support pin 104. The support pin 104 has its longitudinal direction along the front-rear direction, and is arranged to penetrate through the through hole 94 of the support plate 62 and the elongated hole 86 of the back plate 60. An outer thread screw is provided at a rear end of the support pin 104. As shown in FIG. 10, the plate 106 is arranged rearward than the back plate 60, and is accommodated in the guide groove 92 of the back plate 60. As shown in FIG. 15, the plate 106 includes a through hole 106a through which the support pin 104 penetrates. The nut 108 is screwed onto the rear end of the support pin 104.

As shown in FIG. 15, in a state where the lock lever 100 is rotated downward, a portion of the lock lever 100 in the vicinity of the upper end thereof presses the support plate 62. In this state, the support plate 62 and the back plate 60 are pressed together with a strong force between the lock lever 100 and the plate 106. In this case, since the engagement portions 98a, 98b of the support plate 62 and the engagement receiving portions 90a, 90b of the back plate 60 engage with each other firmly, the support plate 62 is fixed to the back plate 60.

Figure 16:
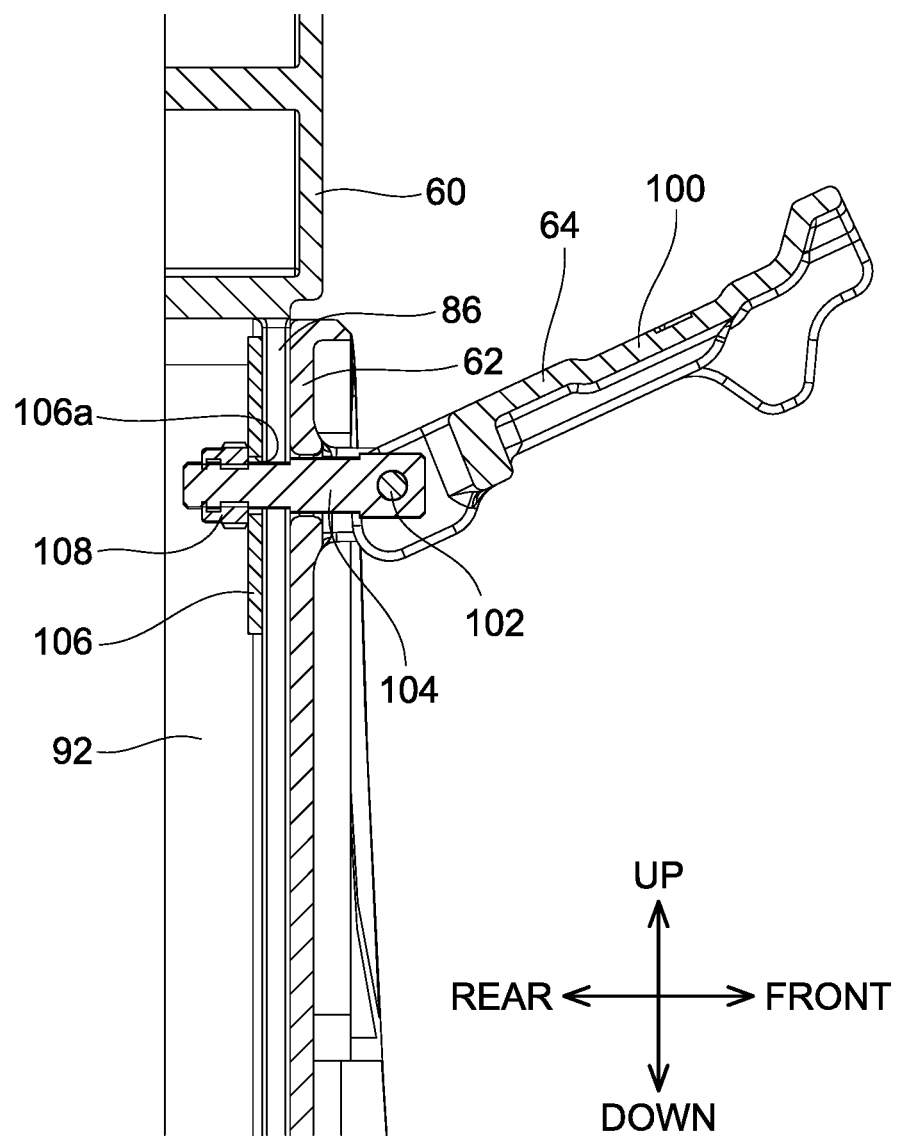
FIG. 16 is a cross-sectional view of the lock mechanism 64 of the back-carried part 6 of the backpack type power supply device 2 according to the embodiment in a state of having rotated the lock mechanism 64 upward.

As shown in FIG. 16, in a state where the lock lever 100 is rotated upward, the portion of the lock lever 100 in the vicinity of the upper end thereof separates away from the support plate 62, by which a state of the support plate 62 and the back plate 60 being pressed together between the lock lever 100 and the plate 106 is released. In this case, engagements of the engagement portions 98a, 98b of the support plate 62 and the engagement receiving portions 90a, 90b of the back plate 60 are released, and the support plate 62 comes to be capable of sliding in the up-down direction relative to the back plate 60. When the support plate 62 is slid to a desired position relative to the back plate 60, the engagement portions 98a, 98b are engaged with the engagement receiving portions 90a, 90b, and the lock lever 100 is rotated downward again, the support plate 62 can be fixed to the back plate 60 at this position.

Figure 17:
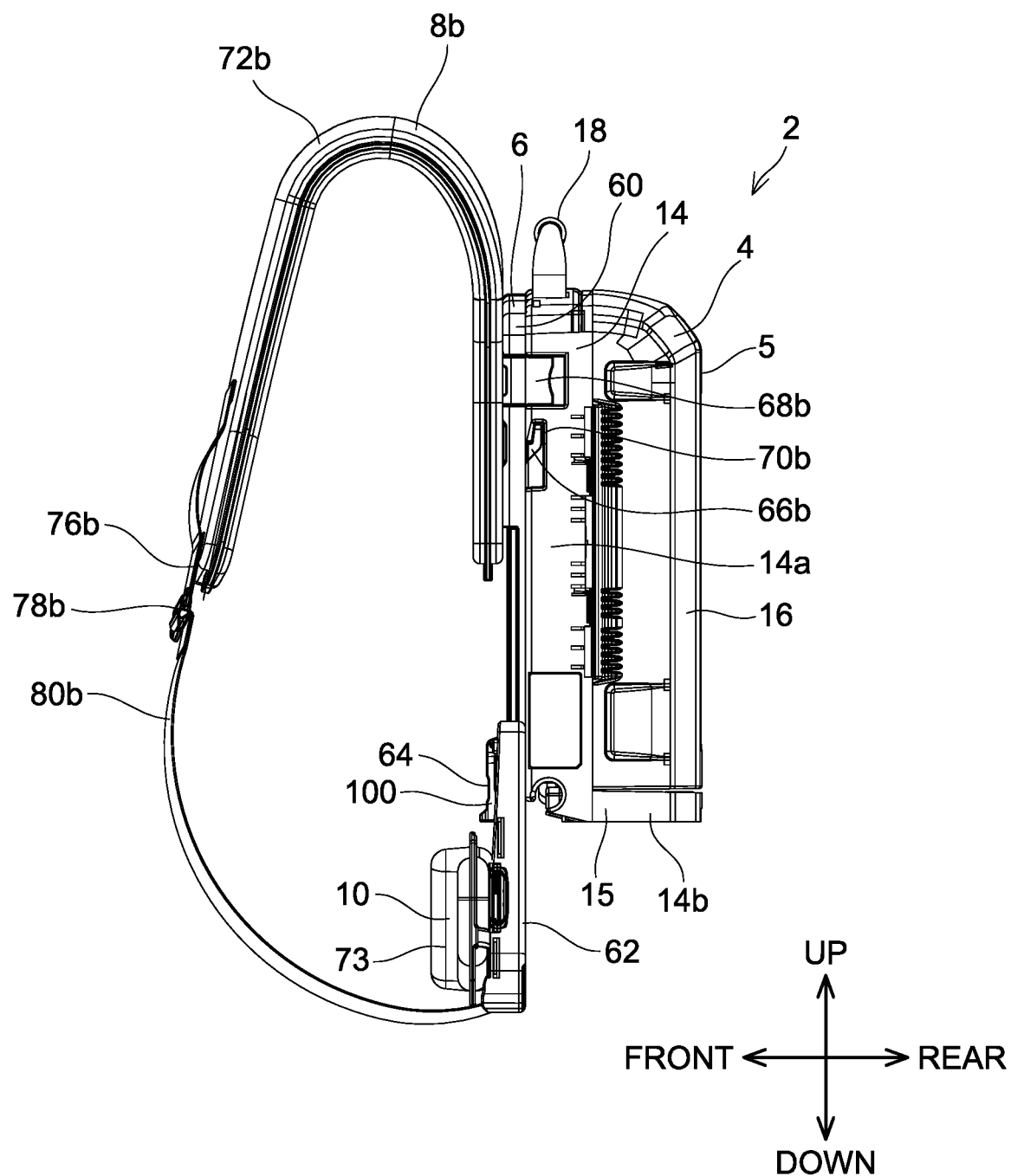
FIG. 17 is a plan view seeing the backpack type power supply device 2 according to the embodiment from a left side in a state where the support plate 62 is slid downward relative to the back plate 60.

As shown in FIG. 17, upon when the user uses the backpack type power supply device 2, a position of the support plate 62 in the up-down direction relative to the back plate 60 can be adjusted so that the waist belt 10 can be wrapped around at the waist position while having the shoulder belts 8a, 8b strapped on the shoulders. By configuring as above, the burden on the body of the user can be reduced. The pads 72a, 72b of the shoulder belts 8a, 8b and the pad 73 of the waist belt 10 are each configured to have a large contact area with the user's body and have a relatively high rigidity so that a weight of the backpack type power supply device 2 can be carried on the user's body by being distributed.

Figure 18:
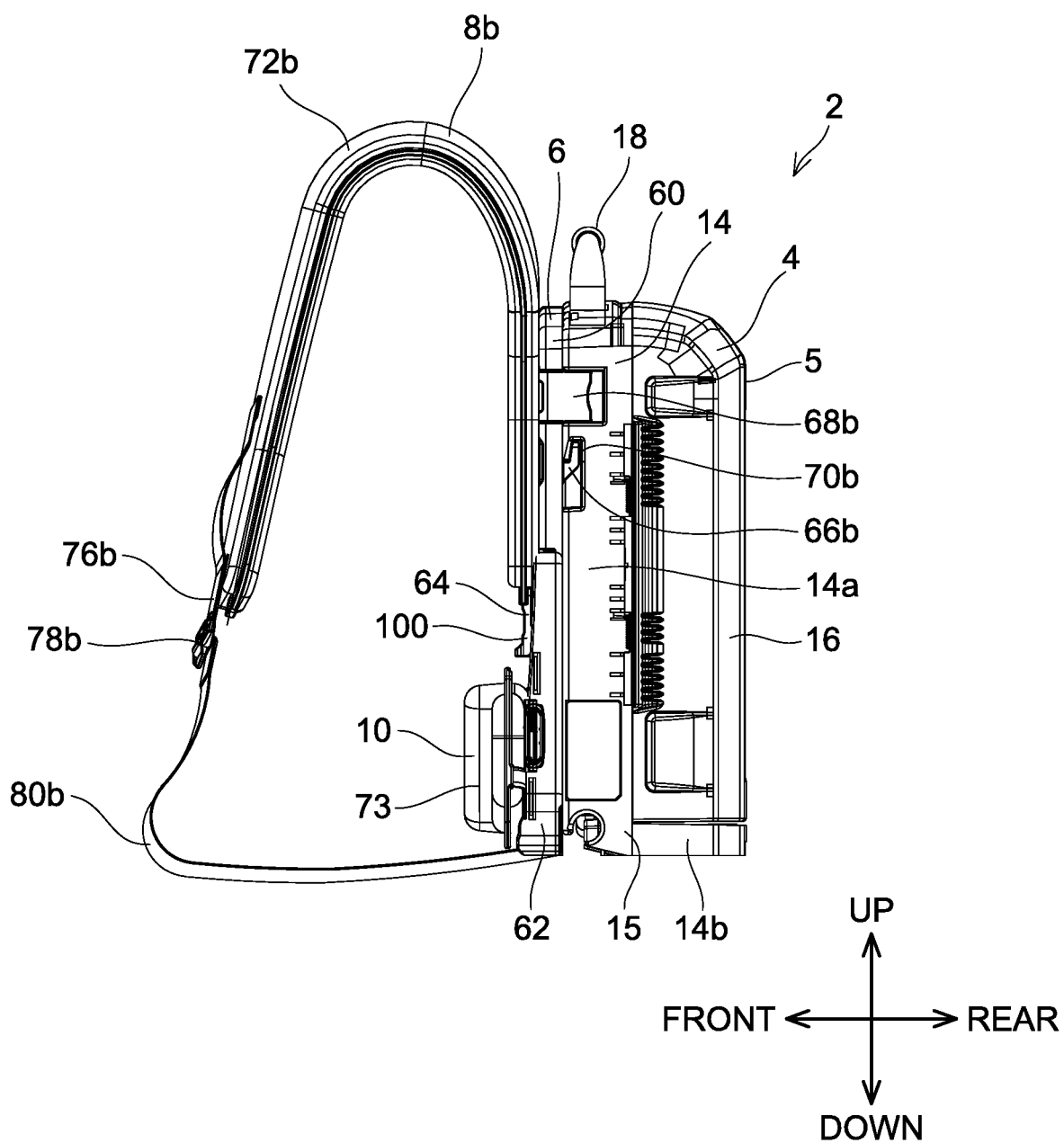
FIG. 18 is a plan view seeing the backpack type power supply device 2 according to the embodiment from the left side in a state where the support plate 62 is slid upward relative to the back plate 60.

When the user is not using the backpack type power supply device 2, there may be a case where the user wishes to place the backpack type power supply device 2 on a horizontal plane with a lower surface of the main body part 4 (lower surface of the support portion 14b of the frame 14) in contact with the horizontal plane. As shown in FIG. 17, in a state where the support plate 62 is located below the back plate 60, a lower end of the waist belt 10 is located below the lower surface of the main body part 4, so the backpack type power supply device 2 cannot be placed on the horizontal plane stably. With the backpack type power supply device 2 of the present embodiment, as shown in FIG. 18, the support plate 62 can be moved upward relative to the back plate 60 so that the lower end of the waist belt 10 comes to be located above the lower surface of the main body part 4. By doing so, the backpack type power supply device 2 can be placed on the horizontal plane with the lower surface of the main body part 4 in contact with the horizontal plane.

Figure 25:
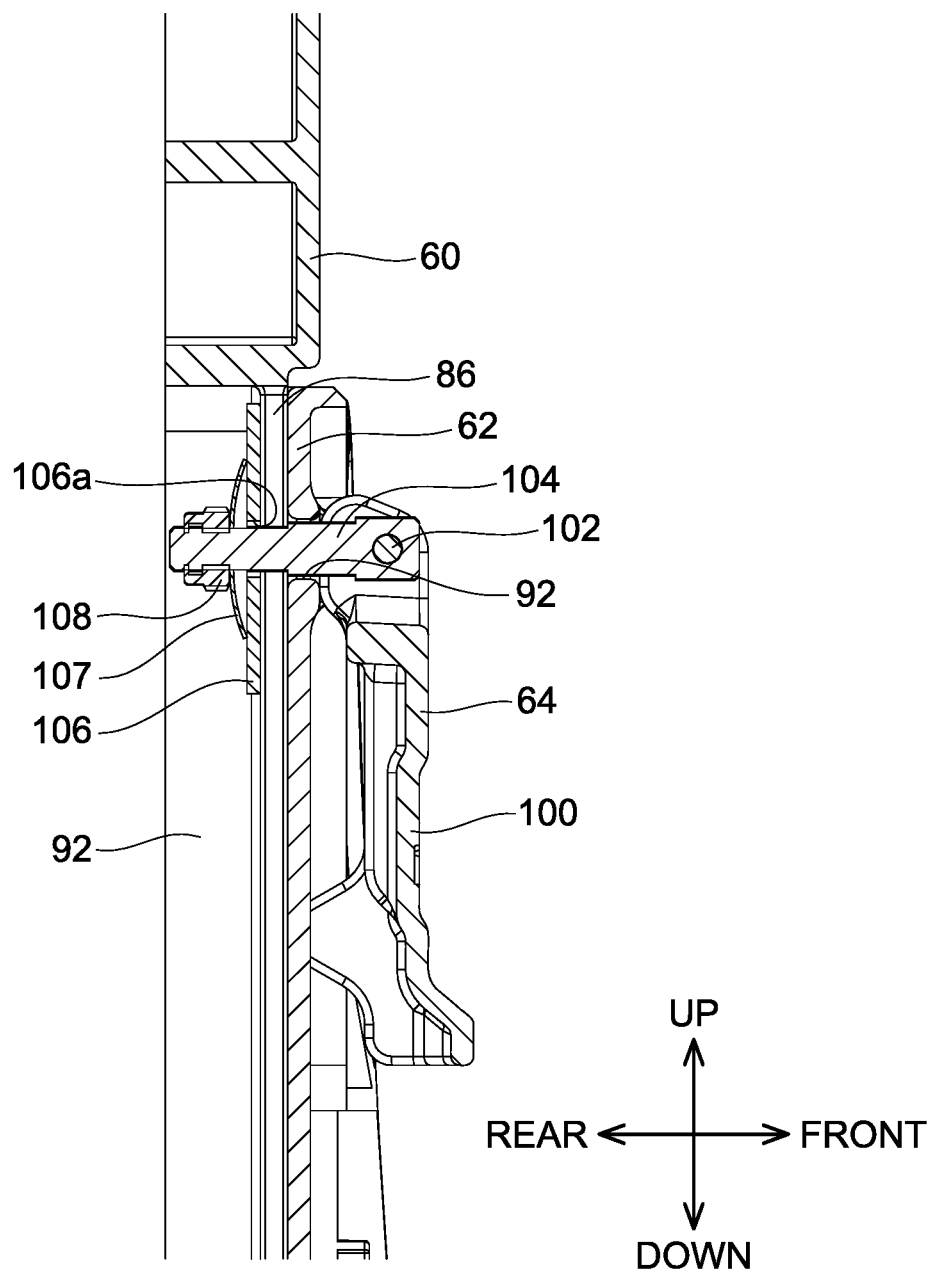
FIG. 25 is a cross-sectional view of a lock mechanism 64 of a back-carried part 6 of a backpack type power supply device 2 according to a variant.

As shown in FIG. 25, the lock mechanism 64 may be configured to include a disc spring 107 interposed between the plate 106 and the nut 108. In the configuration shown in FIG. 25, even in the state where the lock lever 100 is rotated downward and the support plate 62 is fixed to the back plate 60, the disc spring 107 elastically deforms upon when a large load acts on the support plate 62 and the back plate 60, by which the engagements of the engagement portions 98a, 98b and the engagement receiving portions 90a, 90b are released, and thus the support plate 62 comes to be capable of sliding relative to the back plate 60. Due to this, when the large load acts on the support plate 62 and/or the back plate 60, the engagement portions 98a, 98b and the engagement receiving portions 90a, 90b are suppressed from being damaged. In the configuration shown in FIG. 25, a plate spring or a spring washer may be interposed between the plate 106 and the nut 108 instead of the disc spring 107.

Figure 26:
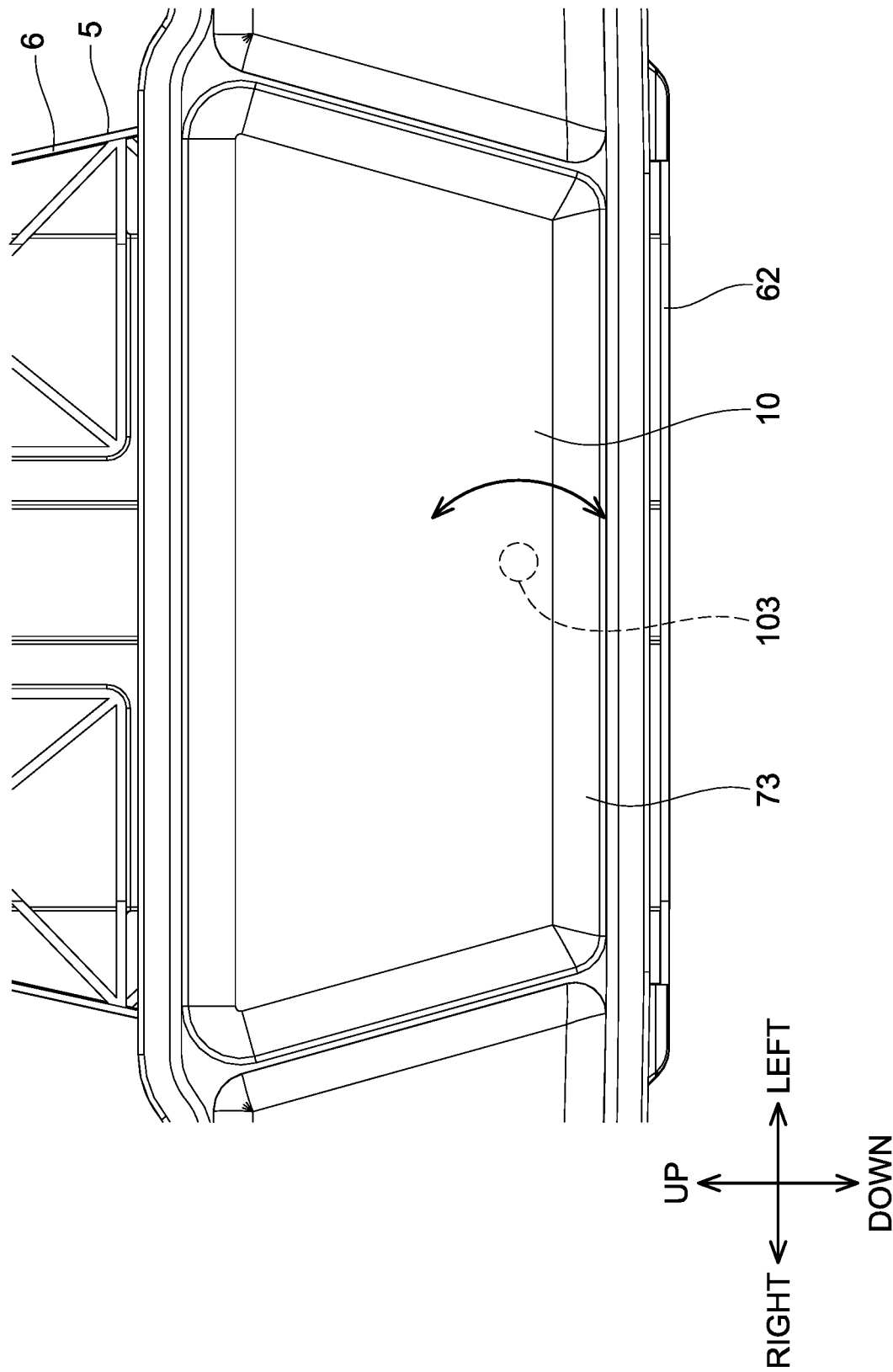
FIG. 26 is a plan view of an attaching portion of a waist belt 10 to a back-carried part 6 in a backpack type power supply device 2 according to a variant seen from a front side.

Positional adjustment of the waist belt 10 in the up-down direction may be realized by another mechanism. For example, as shown in FIG. 26, the waist belt 10 may be rotatably attached to the support plate 62 via a rotation pin 103 under a state in which the support plate 62 is fixed to the back plate 60 at all times. The rotation pin 103 is arranged lower than a center of the waist belt 10 in the up-down direction. The rotation pin 103 has its longitudinal direction along the front-rear direction and the waist belt 10 is configured rotatable relative to the support plate 62 around a rotation axis along the front-rear direction. In the state shown in FIG. 26, the lower end of the waist belt 10 is located above the lower surfaces of the main body part 4 and the back-carried part 6. From this state, when the waist belt 10 is rotated 180 degrees relative to the support plate 62 with the rotation pin 103 as the rotation axis, the lower end of the waist belt 10 comes to be located below the lower surfaces of the main body part 4 and the back-carried part 6. The position of the waist belt 10 in the up-down direction may be adjusted by such a configuration.

Alternatively, as shown in FIG. 27, the waist belt 10 may be detachably attached to the back plate 60 via a hook-and-loop fastener 105 without providing the support plate 62. In this case, the user can adjust the position of the waist belt 10 in the up-down direction to a desired position, and then can attach the waist belt 10 to the back plate 60. The position of the waist belt 10 in the up-down direction may be adjusted according to such a configuration.

Figure 19:
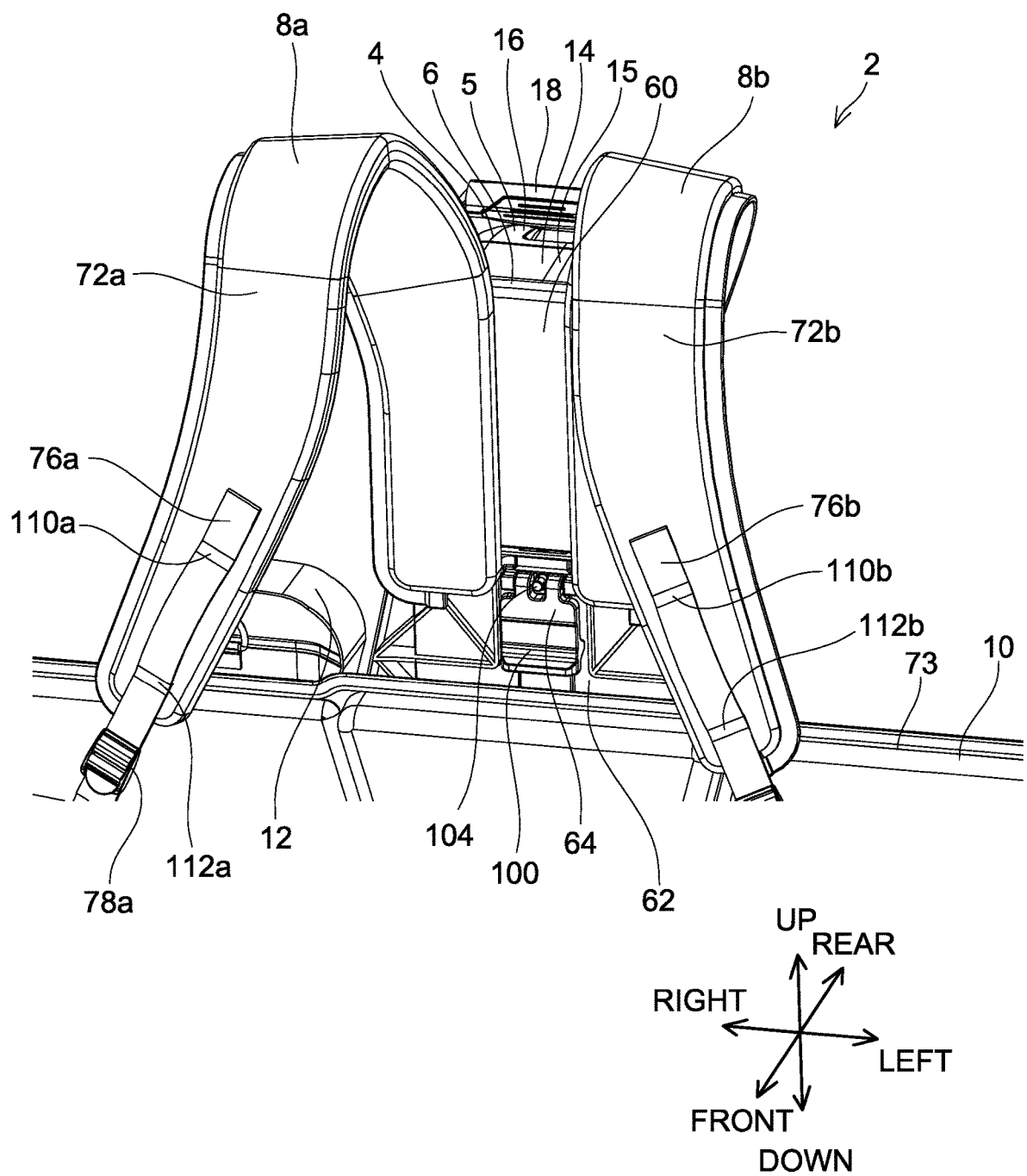
FIG. 19 is a perspective view seeing holding bands 76a, 76b of the shoulder belts 8a, 8b of the backpack type power supply device 2 according to the embodiment from the left upper front side.

As shown in FIG. 19, the holding bands 76a, 76b of the shoulder belts 8a, 8b are fixed to the shoulder belts 8a, 8b respectively at two portions, namely upper fixing portions 110a, 110b and lower fixing portions 112a, 112b. A cable holder 120 shown in FIG. 20 can be attached at each portion of the holding bands 76a, 76b between the upper fixing portions 110a, 110b and the lower fixing portions 112a, 112b. By attaching the cable holder 120 to the holding band 76a (or the holding band 76b), the power cable 38 extending from the main body part 4 can be held by the cable holder 120 upon when the power cable 38 is to be extended from the user's back and onto the chest by strapping it over a shoulder, that is, when the power cable 38 is to be extended along an outer surface of the pad 72a (or the pad 72b) of the shoulder belt 8a (or the shoulder belt 8b), for example.

Figure 20:
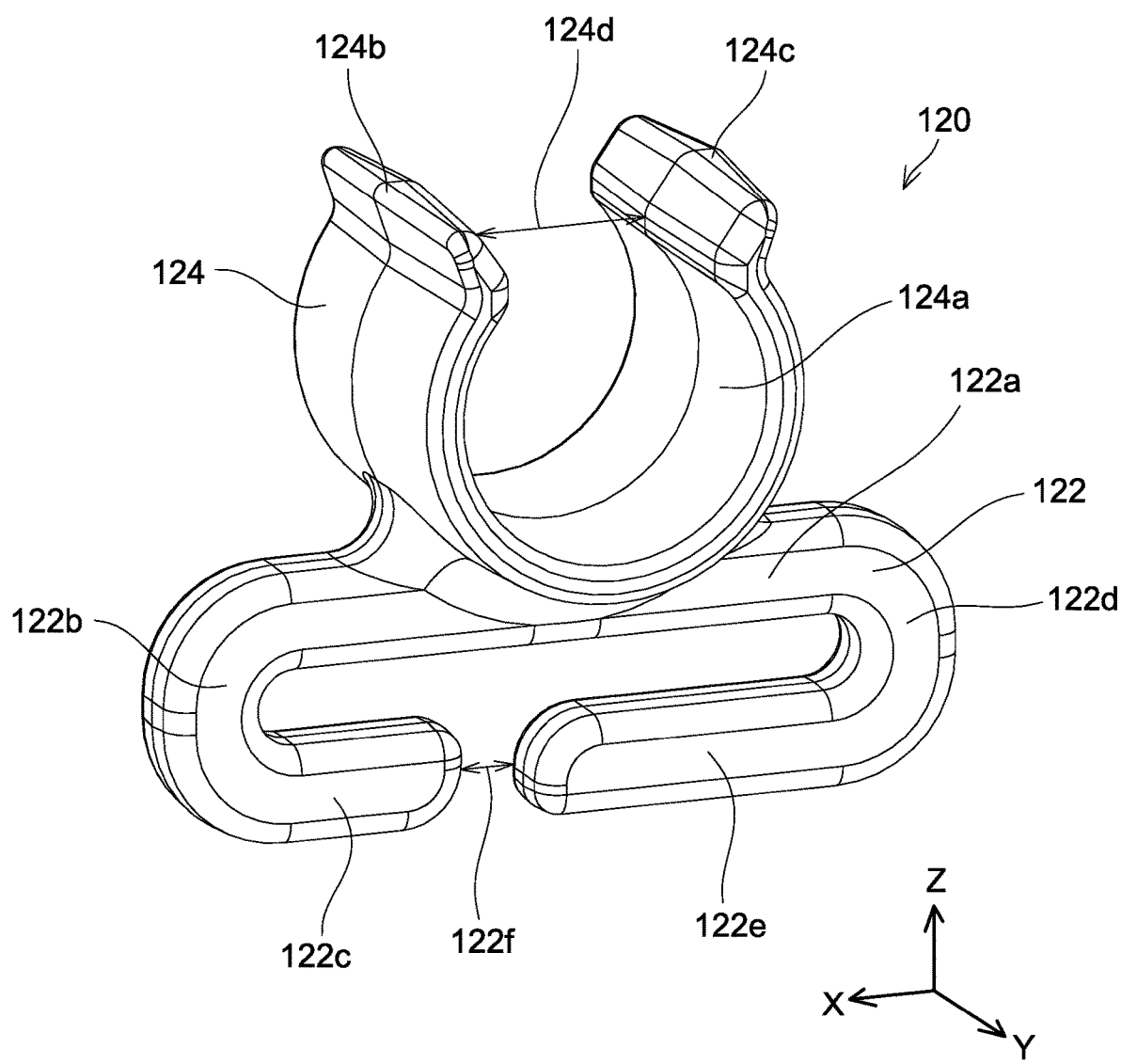
FIG. 20 is a perspective view of a cable holder 120 configured to detachably attach to each of the holding bands 76a, 76b of the shoulder belts 8a, 8b of the backpack type power supply device 2 according to the embodiment.

As shown in FIG. 20, the cable holder 120 is provided with a band attachment section 122 and a cable holding section 124. The band attachment section 122 includes: a first straight portion 122a that extends straight in a X direction; a first foldback portion 122b that gradually curves in a negative Z direction from an end of the first straight portion 122a in a positive X direction and gradually curves further in a negative X direction; a second straight portion 122c that extends straight in the negative X direction from the first foldback portion 122b; a second foldback portion 122d that gradually curves in the negative Z direction from an end of the first straight portion 122a in the negative X direction and gradually curves further in the positive X direction, and a third straight portion 122e that extends straight in the positive X direction from the second foldback portion 122d. The first straight portion 122a, the first foldback portion 122b, the second straight portion 122c, the second foldback portion 122d, and the third straight portion 122e all have a cross sectional shape of a substantially square with rounded corners. The second straight portion 122c and the third straight portion 122e are arranged collinearly. A gap 122f through which the holding band 76a (or the holding band 76b) can pass is provided between a distal end of the second straight portion 122c and a distal end of the third straight portion 122e. In a state where the cable holder 120 is attached to the holding band 76a, a periphery of the holding band 76a is surrounded by the first straight portion 122a, the first foldback portion 122b, the second straight portion 122c, the second foldback portion 122d, and the third straight portion 122e. According to this structure, the cable holder 120 can surely be attached to the holding band 76a.

The cable holding section 124 includes a cylindrical portion 124a having its center axis extending along a Y direction and having a cylindrical shape with an opened end in a positive Z direction, and a first guide portion 124b and a second guide portion 124c that curve outward from respective ends of the cylindrical portion 124a. An opening 124d is provided between the first guide portion 124b and the second guide portion 124c. The cylindrical portion 124a, the first guide portion 124b, and the second guide portion 124c are configured to be wider than the band attachment section 122 in the Y direction. The cylindrical portion 124a is integrally configured with the first straight portion 122a of the band attachment section 122. A width of the opening 124d is smaller than a cable diameter of the power cable 38 in a normal state. Upon holding the power cable 38 by the cable holding section 124, the cylindrical portion 124a elastically deforms in a direction widening the opening 124d by pushing the power cable 38 from outside the cylindrical portion 124a into the opening 124d, by which the power cable 38 becomes accommodated inside the cylindrical portion 124a. Upon detaching the power cable 38 from the cable holding section 124, the cylindrical portion 124a elastically deforms in the direction widening the opening 124d by pulling out the power cable 38 from within the cylindrical portion 124a through the opening 124d, by which the power cable 38 is taken out from the cylindrical portion 124a.

In the cable holder 120, the first straight portion 122a, the first foldback portion 122b, the second straight portion 122c, the second foldback portion 122d, and the third straight portion 122e of the band attachment section 122 all have the cross-sectional shape of a substantially square with rounded corners. Due to this, even in a case where external force in a direction shifting the cable holder 120 down acts on the cable holder 120 in the state of having the cable holder 120 attached to the holding baud 76a, the cable holder 120 shifts down without fighting against the external force, thus the band attachment section 122 can be suppressed from being damaged. The cross-sectional shape of the first straight portion 122a, the first foldback portion 122b, the second straight portion 122c, the second foldback portion 122d, and the third straight portion 122e may be any cross-sectional shape so long as the shape facilitates rolling, and for example, it may be a shape with no corners such as a substantially circular shape and a substantially oval shape, and may be a polygonal shape of which corners form obtuse angles, such as a substantially hexagonal shape and a substantially octagonal shape.

In the cable holder 120, the gap 122f for putting the holding band 76a into and out of the band attachment section 122 is provided at a position that does not face either end of the holding band 76a when the holding band 76a is attached. Due to this, the cable holder 120 can be suppressed from inadvertently becoming detached from the holding band 76a.

In the cable holder 120, the width of the opening 124d of the cable holding section 124 changes by elastic deformation of the cylindrical portion 124a. Due to this, even when the user accidentally drops an electrically-powered device (such as a power tool) to which the power cable 38 is attached in the state where the cable holding section 124 is holding the power cable 38, the cylindrical portion 124a elastically deforms to widen the opening 124d, and the power cable 38 detaches from the cable holding section 124. By configuring as above, the electrically-powered device can be suppressed from colliding with the user by the power cable 38 moving like a pendulum with the cable holder 120 as a fulcrum upon when the user accidentally drops the electrically-powered device to which the power cable 38 is attached.

Figure 21:
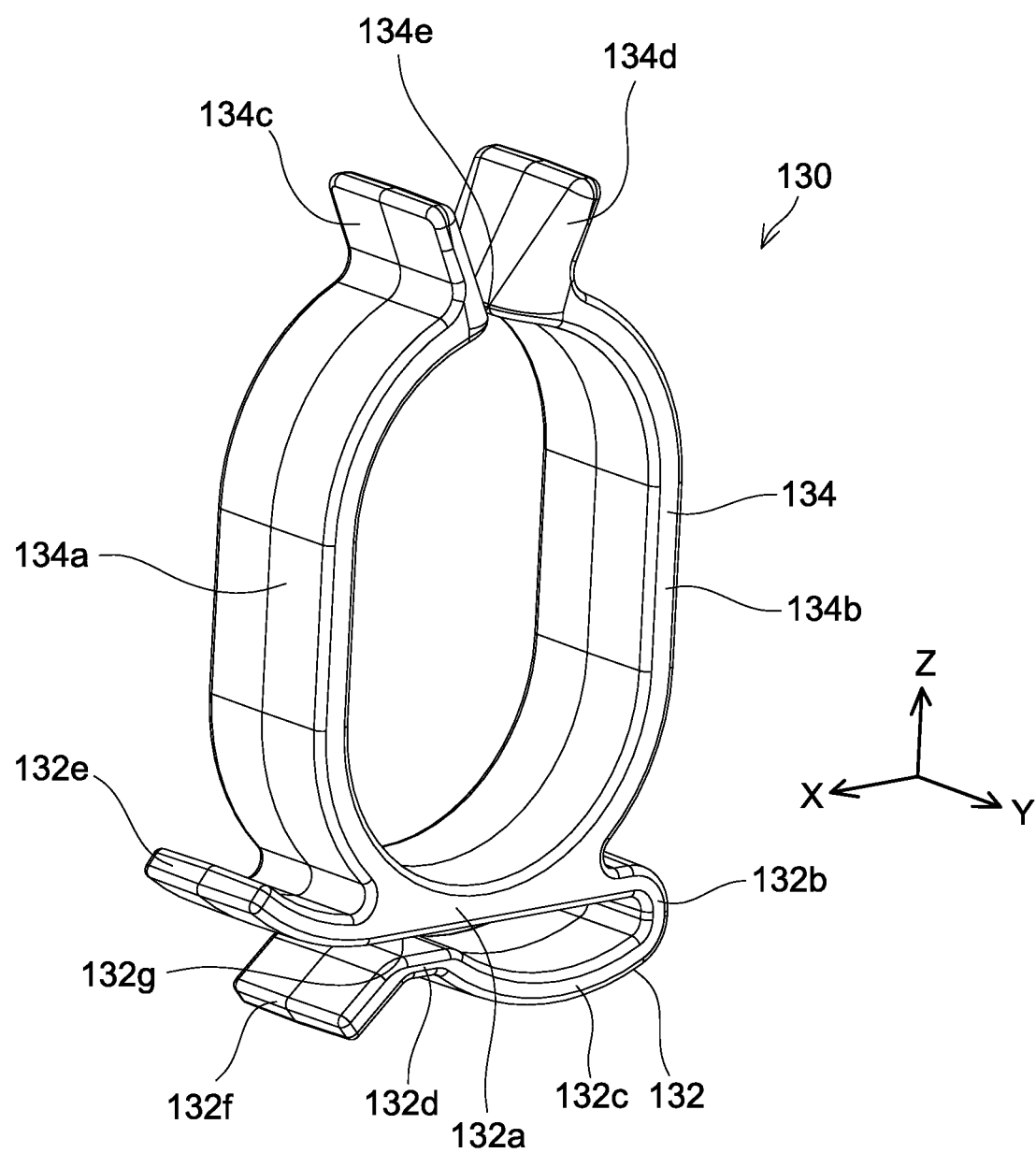
FIG. 21 is a perspective view of a cable holder 130 configured to detachably attach to each of the holding bands 76a, 76b of the shoulder belts 8a, 8b of the backpack type power supply device 2 according to the embodiment.

Alternatively, instead of the cable holder 120 of FIG. 20, a cable holder 130 of FIG. 21 may be used. The cable holder 130 includes a band attachment section 132 and a cable holding section 134. The band attachment section 132 includes: a first flat portion 132a that extends flat in the X direction; a foldback portion 132b that gradually curves in the negative Z direction from an end of the first flat portion 132a in the negative X direction; a curved portion 132c that gradually curves in the positive X direction from the foldback portion 132b and gradually curves further in the positive Z direction; a second flat portion 132d that extends flat in the positive X direction from the curved portion 132c; a first guide portion 132e that curves outward from an end of the first flat portion 132a in the positive X direction; and a second guide portion 132f that curves outward from an end of the second flat portion 132d in the positive X direction. A gap 132g is provided between the first flat portion 132a and the second flat portion 132d. A width of the gap 132g is smaller than a thickness of the holding bands 76a, 76b. Upon attaching the cable holder 130 to the holding band 76a, the holding band 76a is inserted into the band attachment section 132 through the gap 132g. In doing so, the curved portion 132c elastically deforms, by which the holding band 76a is held between the first flat portion 132a and the second flat portion 132d in a state of having a majority of the holding band 76a having entered inside the band attachment section 132.

The cable holding section 134 includes a first curved portion 134a, a second curved portion 134b, a third guide portion 134c that curves outward from the first curved portion 134a, and a fourth guide portion 134d that curves outward from the second curved portion 134b. The first curved portion 134a and the second curved portion 134b have their longitudinal direction in the Z direction when seen in a plan view along a positive Y direction, and form an oval shape having an opened end in the positive Z direction. The first curved portion 134a and the second curved portion 134b are integrally configured with the first flat portion 132a of the band attachment section 132. An opening 134e is provided between the third guide portion 134c and the fourth guide portion 134d. A width of the opening 134e is smaller than the cable diameter of the power cable 38 in the normal state. Upon holding the power cable 38 by the cable holding section 134, the first curved portion 134a and the second curved portion 134b elastically deform in a direction widening the opening 134e by pushing the power cable 38 from outside the cable holding section 134 through the opening 134e, by which the power cable 38 becomes accommodated inside the cable holding section 134. Upon detaching the power cable 38 from the cable holding section 134, the first curved portion 134a and the second curved portion 134b elastically deform in the direction widening the opening 134e by pulling out the power cable 38 from within the cable holding portion 134 through the opening 134e, by which the power cable 38 is taken out from the cable holding section 134.

In the cable holder 130, the width of the opening 134e of the cable holding section 134 changes by elastic deformation of the first curved portion 134a and the second curved portion 134b. Due to this, even when the user accidentally drops the electrically-powered device (such as a power tool) to which the power cable 38 is attached in the state where the cable holding section 134 is holding the power cable 38, the first curved portion 134a and the second curved portion 134b elastically deform to widen the opening 134e, and the power cable 38 detaches from the cable holding section 134. By configuring as above, the electrically-powered device can be suppressed from colliding with the user by the power cable 38 moving like a pendulum with the cable holder 130 as a fulcrum upon when the user accidentally drops the electrically-powered device to which the power cable 38 is attached.

Figure 22:
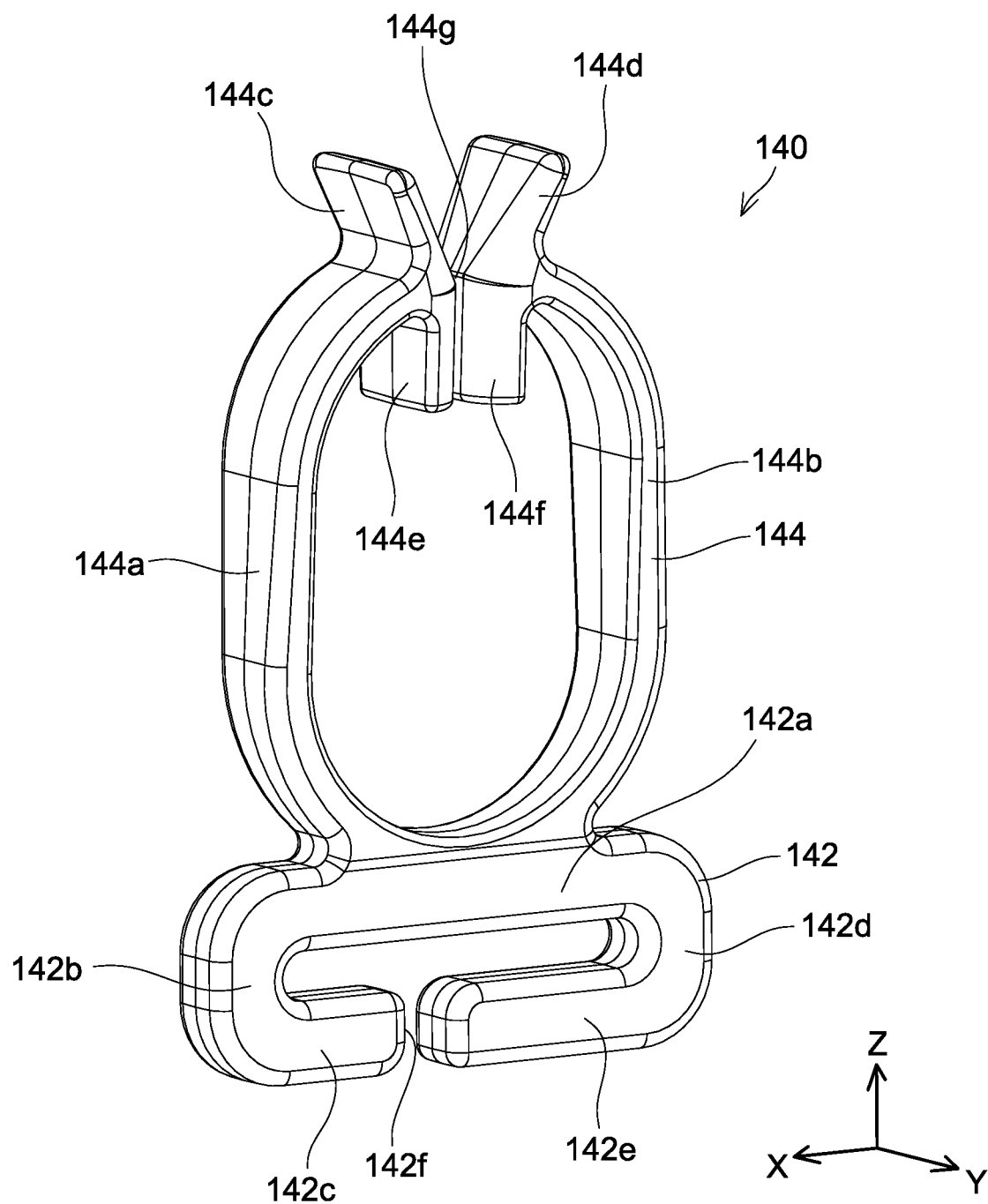
FIG. 22 is a perspective view of a cable holder 140 configured to detachably attach to each of the holding bands 76a, 76b of the shoulder belts 8a, 8b of the backpack type power supply device 2 according to the embodiment.

Alternatively, instead of the cable holder 120 of FIG. 20, a cable holder 140 of FIG. 22 may be used. The cable holder 140 includes a band attachment section 142 and a cable holding section 144. The band attachment section 142 includes: a first straight portion 142a that extends straight in the X direction; a first foldback portion 142b that gradually curves in the negative Z direction from an end of the first straight portion 142a in the positive X direction and gradually curves further in the negative X direction; a second straight portion 142c that extends straight in the negative X direction from the first foldback portion 142b; a second foldback portion 142d that gradually curves in the negative Z direction from an end of the first straight portion 142a in the negative X direction and gradually curves further in the positive X direction; and a third straight portion 142e that extends straight in the positive X direction from the second foldback portion 142d. The first straight portion 142a, the first foldback portion 142b, the second straight portion 142c, the second foldback portion 142d, and the third straight portion 142e all have a cross sectional shape of a substantially square with rounded corners. The second straight portion 142c and the third straight portion 142e are arranged collinearly. A gap 142f through which the holding band 76a (or the holding band 76b) can pass is provided between a distal end of the second straight portion 142c and a distal end of the third straight portion 142e. In a state where the cable holder 140 is attached to the holding band 76a, the periphery of the holding band 76a is surrounded by the first straight portion 142a, the first foldback portion 142b, the second straight portion 142c, the second foldback portion 142d, and the third straight portion 142e. According to this structure, the cable holder 140 can surely be attached to the holding band 76a.

The cable holding section 144 includes a first curved portion 144a, a second curved portion 144b, a first guide portion 144c that curves outward from the first curved portion 144a, a second guide portion 144d that curves outward from the second curved portion 144b, a first retaining portion 144e that extends inward in a flat shape from the first curved portion 144a, and a second retaining portion 144f that extends inward in a flat shape from the second curved portion 144b. The first curved portion 144a and the second curved portion 144b have their longitudinal direction in the Z direction when seen in the plan view along the positive Y direction, and form an oval shape having an opened end in the positive Z direction. The first curved portion 144a and the second curved portion 144b are integrally configured with the first straight portion 142a of the band attachment section 142. An opening 144g is provided between the first guide portion 144c and the second guide portion 144d. A width of the opening 144g is smaller than the cable diameter of the power cable 38 in the normal state. Upon holding the power cable 38 by the cable holding section 144, the first curved portion 144a and the second curved portion 144b elastically deform in a direction widening the opening 144g by pushing the power cable 38 from outside the cable holding section 144 through the opening 144g, by which the power cable 38 becomes accommodated inside the cable holding section 144. Upon detaching the power cable 38 from the cable holding section 144, the first curved portion 144a or the second curved portion 144b is elastically deformed in the direction widening the opening 144g by grabbing the first guide portion 144c or the second guide portion 144d. Then, the power cable 38 is positioned between the first retaining portion 144e and the second retaining portion 144f and the power cable 38 is pulled out from within the cable holding section 144 through the opening 144g, by which the power cable 38 is taken out from the cable holding section 144.

In the cable holder 140, the first straight portion 142a, the first foldback portion 142b, the second straight portion 142c, the second foldback portion 142d, and the third straight portion 142e of the band attachment section 142 all have a cross sectional shape of a substantially square with rounded corners. Due to this, even in a case where external force in a direction shifting the cable holder 140 down acts on the cable holder 140 in the state of having the cable holder 140 attached to the holding band 76a, the cable holder 140 shifts down without fighting against the external force, thus the band attachment section 142 can be suppressed from being damaged. The cross-sectional shape of the first straight portion 142a, the first foldback portion 142b, the second straight portion 142c, the second foldback portion 142d, and the third straight portion 142e may be any cross-sectional, shape so long as the shape facilitates rolling, and for example, it may be a shape with no corners such as a substantially circular shape and a substantially oval shape, and may be a polygonal shape of which corners form obtuse angles, such as a substantially hexagonal shape and a substantially octagonal shape.

In the cable holder 140, the gap 142f for putting the holding band 76a into and out of the band attachment section 142 is provided at a position that does not face either end of the holding band 76a when the holding band 76a is attached.

Due to this, the cable holder 140 can be suppressed from inadvertently becoming detached from the holding band 76a.

In the cable holder 140, the first retaining portion 144e and the second retaining portion 144f are provided in a vicinity of the opening 144g of the cable holding section 144. Due to this, the power cable 38 can be suppressed from inadvertently becoming detached from the cable holder 140.

Instead of being attached to the holding bands 76a, 76b of the shoulder belts 8a, 8b, the cable holders 120, 130, 140 may be attached to other bands, such as the adjustment bands 80a, 80b of the shoulder belts 8a, 8b. Alternatively, the cable holders 120, 130, 140 may be attached to the holding band 77 and the adjustment band 81 of the waist belt 10. Alternatively, the cable holders 120, 130, 140 may be attached to other bands (not shown) which the user is wearing.

In one or more embodiments, the main body part 4 (which is an example of a battery mount device) of the backpack type power supply device 2 includes: the housing 15 to which the battery packs 20a, 20b, 20c, 20d are detachably attached; and the cover 16 attached to the housing 15 so as to cover the battery packs 20a, 20b, 20c, 20d and configured to open and close by rotating around the rotation axis. In a state where the main body part 4 is placed on a horizontal plane, force in the direction closing the cover 16 acts on the cover 16.

According to the above configuration, in the state where the main body part 4 is placed on a horizontal plane, the force in the direction closing the cover 16 acts on the cover 16, thus the cover 16 can surely be kept closed. Due to this, even in a case where water splashes on the main body part 4, the battery packs 20a, 20b, 20c, 20d can be suppressed from becoming wet.

In one or more embodiments, the main body part 4 is further provided with the sealer 42 configured to seal the periphery of the cover 16 when the cover 16 is closed.

According to the above configuration, even in the case where water splashes on the main body part 4, the battery packs 20a, 20b, 20c, 20d can surely be suppressed from becoming wet.

In one or more embodiments, the main body part 4 is further provided with the torsion spring 40 (which is an example of a biasing member) configured to bias the cover 16 in the direction closing the cover 16. In this case, the force in the direction closing the cover 16 that acts on the cover 16 in the state where the main body part 4 is placed on a horizontal plane includes biasing force by the torsion spring 40.

According to the above configuration, the torsion spring 40 biases the cover 16 in the closing direction even when the main body part 4 is not in the state of being placed on a horizontal plane. Even in the case where water splashes on the main body part 4 when the main body part 4 is not in the state of being placed on a horizontal plane, the battery packs 20a, 20b, 20c, 20d can be suppressed from becoming wet.

In one or more embodiments, the main body part 4 is further provided with the latch member 44 and the latch receiver 14c (which are an example of a lock mechanism) configured to hold the state where the cover 16 is closed after the cover 16 is closed.

According to the above configuration, even in a case where force in a direction opening the cover 16 inadvertently acts on the cover 16 after the cover 16 is closed, this state in which the cover 16 is closed can be maintained. A situation in which the battery packs 20a, 20b, 20c, 20d becomes wet can surely be suppressed from occurring.

In one or more embodiments, the main body part 4 (which is an example of a battery mount device) of the backpack type power supply device 2 includes; the housing 15 to which the battery packs 20*a*, 20*b*, 20*c*, 20*d* are detachably attached; the cover 16 attached to the housing 15 so as to cover the battery packs 20*a*, 20*b*, 20*c*, 20*d* and configured to open and close by rotating around the rotation axis; and the cover holding mechanism 46 configured to hold the cover 16 in the open state. The cover holding mechanism 46 is provided with the cover holder 47 configured to move between the holding position interfering with the rotating motion of the cover 16 and the released position not interfering with the rotating motion of the cover 16 according to an operation by the user.

According to the above configuration, the cover 16 can be held in the open state by the cover holding mechanism 46 upon attaching or detaching the battery packs 20*a*, 20*b*, 20*c*, 20*d* to or from the housing 15, thus the user does not have to hold the cover 16 in the open state by gripping it with one of his/her hands. Attaching and detaching work of the battery packs 20*a*, 20*b*, 20*c*, 20*d* can be performed easily.

In one or more embodiments, the cover holding mechanism 46 further includes the compression spring 54 (which is an example of a first biasing member) configured to bias the cover holder 47 from the holding position toward the released position.

According to the above configuration, the cover holder 47 can be returned from the holding position to the released position by the biasing force of the compression spring 54 after the attaching and detaching work of the battery packs 20*a*, 20*b*, 20*c*, 20*d* is completed.

In one or more embodiments, the main body part 4 further includes the torsion spring 40 (which is an example of a second biasing member) configured to bias the cover 16 in the direction closing the cover 16.

According to the above configuration, the cover 16 can surely be kept closed in a situation were the attaching and detaching work of the battery packs 20*a*, 20*b*, 20*c*, 20*d* is not being performed.

In one or more embodiments, the main body part 4 further includes the power cable 38 (which is an example of a power output) configured to output power from the battery packs 20*a*, 20*b*, 20*c*, 20*d* to another device. The main body part 4 is configured capable of attaching the shoulder belts 8*a*, 8*b* which the user straps on his/her shoulders.

According to the above configuration, the backpack type power supply device 2 using the main body part 4 can be realized.

In one or more embodiments, the rotation axis of the cover 16 extends along the longitudinal direction of the housing 15.

If the rotation axis of the cover 16 extends orthogonal to the longitudinal direction of the housing 15, a tip of the cover 16 rotates on a large trajectory upon opening and closing the cover 16, thus it could easily interfere with the body of the user or with a surrounding object. By configuring the rotation axis of the cover 16 to extend along the longitudinal direction of the housing 15 as above, the tip of the cover 16 can be rotated on a small trajectory upon opening and closing the cover 16, and interference with the body of the user or with the surrounding object can be suppressed from occurring.

In one or more embodiments, the battery packs 20*a*, 20*b*, 20*c*, 20*d* are configured to be attached to or detached from the housing 15 by sliding in the sliding direction. The sliding direction is substantially parallel to a plane orthogonal to the rotation axis of the cover 16.

According to the above configuration, the cover 16 does not interfere upon opening the cover 16 relative to the housing 15 and sliding the battery packs 20*a*, 20*b*, 20*c*, 20*d* in the sliding direction relative to the housing 15. The attaching and detaching work of the battery packs 20*a*, 20*b*, 20*c*, 20*d* can easily be performed.

In one or more embodiments, the battery packs 20*a*, 20*b*, 20*c*, 20*d* are arranged along the longitudinal direction of the housing 15.

According to the above configuration, upon sliding one of the battery packs 20*a*, 20*b*, 20*c*, 20*d*, such as the battery pack 20*a*, in the sliding direction relative to the housing 15, other battery packs 20*b*, 20*c*, 20*d* attached to the housing 15 do not interfere. The attaching and detaching work of the battery packs 20*a*, 20*b*, 20*c*, 20*d* can more easily be performed.

In one or more embodiments, the cable holders 120, 130, 140 include the band attachment sections 122, 132, 142 detachably attached to the holding band 76*a* (which is an example of a band) which the user is wearing and the cable holding sections 124, 134, 144 configured to detachably hold the power cable 38 (which is an example of a cable). Each pair of the band attachment sections 122, 132, 142 and the cable holding sections 124, 134, 144 is integrally configured.

According to the above configuration, since the band attachment sections 122, 132, 142 are configured to be detachably attached to the holding band 76*a*, only the cable holders 120, 130, 140 can be detached without detaching the holding band 76*a* which the user is wearing.

In one or more embodiments, the band attachment sections 122, 142 are provided with the gaps 122*f*, 142*f* and have the shape surrounding the periphery of the holding band 76*a*.

According to the above configuration, the cable holders 120, 140 can be attached to and detached from the holding band 76*a* by inserting or taking out the holding band 76*a* into or from the band attachment sections 122, 142 through the gaps 122*f*, 142*f*.

In one or more embodiments, the band attachment sections 122, 142 have the cross-sectional shape that facilitates rolling.

According to the above configuration, when the external force in the direction shifting the cable holders 120, 140 down acts on the cable holders 120, 140 attached to the holding band 76*a*, the cable holders 120, 140 shift down without fighting against the external force. Thus, the cable holders 120, 140 can be suppressed from being damaged.

In one or more embodiments, the cable holding sections 124, 134 have the shape including the openings 124*d*, 134*e*. The width of the openings 124*d*, 134*e* is smaller than the cable diameter of the power cable 38 in the normal state, and becomes larger than the cable diameter of the power cable 38 by the elastic deformation of the cable holding sections 124, 134 upon attaching or detaching the power cable 38.

According to the above configuration, the power cable 38 can be attached to or detached from the cable holders 120, 130 by inserting or taking out the power cable 38 into or from the cable holding sections 124, 134 through the openings 124*d*, 134*e*. Further, according to the above configuration, when large force acts on the power cable 38, such as when the device connected to the power cable 38 falls and the power cable 38 is thereby yanked, the power cable 38 detaches from the cable holders 120, 130, and the power cable 38 separates away from the holding band 76*a* which the user is wearing. By configuring as above, user safety can be ensured.

In one or more embodiments, the holding band 76a to which the cable holders 120, 130, 140 are attached is provided on the shoulder belt 8a of the backpack type power supply device 2. The power cable 38 which the cable holders 120, 130, 140 hold extends from the backpack type power supply device 2.

According to the above configuration, the power cable 38 which extends from the backpack type power supply device 2 is extended from the user's back over the shoulder and along the chest, by which the power cable 38 can be suppressed from becoming loose and sagged.

In one or more embodiments, the backpack type power supply device 2 (which is an example of a backpack type device) includes the body 5, the shoulder belts 8a, 8b which the user straps over his/her shoulders, and the waist belt 10 which the user wraps around his/her waist. The waist belt 10 is configured to switch between the state in which the lower end of the waist belt 10 is located below the lower surface of the body 5 and the state in which the lower end of the waist belt 10 is located above the lower surface of the body 5. The backpack type power supply device 2 is configured capable of bringing the lower surface of the body 5 into contact with a horizontal plane to be placed on the horizontal plane in the state where the lower end of the waist belt 10 is located above the lower surface of the body 5.

According to the above configuration, when the user uses the backpack type power supply device 2 by carrying it on his/her back, the position of the waist belt 10 can be adjusted to the position of the user's waist by bringing the waist belt 10 to the state where the lower end of the waist belt 10 is located below the lower surface of the body 5, and the burden on the user's body can be reduced. Further, upon placing the backpack type power supply device 2 on a horizontal plane, the waist belt 10 can be arranged such that the lower surface of the body 5 is brought into contact with the horizontal plane to be placed on the horizontal plane in the state where the lower end of the waist belt 10 is located above the lower surface of the body 5.

In one or more embodiments, the body 5 includes the main body part 4 and the back-carried part 6 to which the main body part 4 is detachably attached, and to which the shoulder belts 8a, 8b and the waist belt 10 are attached.

According to the above configuration, the main body part 4 may be used or be subjected to maintenance in the state of having detached the main body part 4 from the back-carried part 6.

In one or more embodiments, the back-carried part 6 includes the back plate 60 to which upper ends of the shoulder belts 8a, 8b are attached, the support plate 62 to which the waist belt 10 is attached and configured capable of changing its position in the up-down direction relative to the back plate 60, and the lock mechanism 64 configured to fix the position of the support plate 62 relative to the back plate 60. The lower surface of the body 5 is constituted by the main body part 4 and/or the back plate 60.

According to the above configuration, the state where the lower end of the waist belt 10 is located below the lower surface of the body 5 and the state where the lower end of the waist belt 10 is located above the lower surface of the body 5 can be switched with a relatively simple configuration.

In one or more embodiments, the waist belt 10 is attached so as to be rotatable around the rotation axis extending in the front-rear direction relative to the body 5. The rotation axis of the waist belt 10 is arranged at a position separated away from a center of the waist belt 10 in the up-down direction.

According to the above configuration, the waist belt 10 can be switched from the state where the lower end of the waist belt 10 is located below the lower surface of the body 5 to the state where the lower end of the waist belt 10 is located above the lower surface of the body 5 by rotating 180 degrees around the rotation axis relative to the body 5. The switch between the state where the lower end of the waist belt 10 is located below the lower surface of the body 5 and the state where the lower end of the waist belt 10 is located above the lower surface of the body 5 can be performed with a relatively simple configuration.

In one or more embodiments, the waist belt 10 is detachably attached to the body 5 by the hook-and-loop fastener 105.

According to the above configuration, the state where the lower end of the waist belt 10 is located below the lower surface of the body 5 and the state where the lower end of the waist belt 10 is located above the lower surface of the body 5 can be switched by adjusting an attaching position of the waist belt 10 relative to the body 5 in the up down direction. The switch between the state where the lower end of the waist belt 10 is located below the lower surface of the body 5 and the state where the lower end of the waist belt 10 is located above the lower surface of the body 5 can be performed with a relatively simple configuration.

What is claimed is:

1. A battery mount device comprising:
a housing to which a battery pack is detachably attached;
a cover attached to the housing so as to cover the battery pack and configured to open and close by rotating around a rotation axis; and
a cover holding mechanism configured to hold the cover in an open state,
wherein the cover holding mechanism includes a cover holder and a first biasing member,
the cover holder is supported by the housing and configured to move relative to the housing,
the cover holder is configured to move, in response to an operation by a user, between a holding position and a released position along a direction substantially parallel to the rotation axis of the cover,
when the cover holder is in the holding position, the cover holder interferes with a rotating motion of the cover,
when the cover holder is in the released position, the cover holder does not interfere with the rotating motion of the cover, and
the first biasing member is configured to bias the cover holder from the holding position toward the released position.

2. The battery mount device according to claim 1, further comprising a sealer configured to seal a periphery of the cover when the cover is closed.

3. The battery mount device according to claim 1, further comprising a lock mechanism configured to hold a state where the cover is closed after the cover is closed.

4. The battery mount device according to claim 1, further comprising a power output configured to output power from the battery pack to another device,
wherein a shoulder belt configured to be strapped on a shoulder of a user is configured attachable to the battery mount device.

5. The battery mount device according to claim 1, wherein the rotation axis extends along a longitudinal direction of the housing.

6. The battery mount device according to claim 5, wherein
the battery pack is configured attachable to and detachable from the housing by sliding in a sliding direction with respect to the housing, and
the sliding direction is substantially parallel to a plane orthogonal to the rotation axis.

7. The battery mount device according to claim 6, wherein
the battery pack comprises a plurality of battery packs, and
the housing is configured to arrange the battery packs side by side in the longitudinal direction of the housing.

8. The battery mount device according to claim 1, further comprising a second biasing member configured to bias the cover to close the cover.

9. The battery mount device according to claim 1, wherein the first biasing member includes an elastic member configured to bias the cover holder from the holding position toward the released position.

10. The battery mount device according to claim 1, wherein,
in a state where the cover holding mechanism holds the cover in the open state, the cover holder is held at the holding position by engaging the cover with the cover holder, and
when the cover is rotated further in an opening direction from the state where the cover holding mechanism holds the cover in the open state, the cover and the cover holder are disengaged, and the cover holder moves from the holding position to the released position by a biasing force of the first biasing member.

11. A battery mount device comprising:
a housing to which a battery pack is detachably attached;
a cover attached to the housing so as to cover the battery pack and configured to open and close by rotating around a rotation axis; and
a cover holding mechanism configured to hold the cover in an open state,
wherein the cover holding mechanism includes a cover holder,
the cover holder is supported by the housing and configured to move relative to the housing,
the cover holder is configured to move, in response to an operation by a user, between a holding position and a released position along a direction substantially parallel to the rotation axis of the cover,
when the cover holder is in the holding position, the cover holder interferes with a rotating motion of the cover, and
when the cover holder is in the released position, the cover holder does not interfere with the rotating motion of the cover.

* * * * *